(12) United States Patent
Chikada et al.

(10) Patent No.: US 7,821,390 B2
(45) Date of Patent: Oct. 26, 2010

(54) SYSTEM USING ELECTRONIC DEVICES CONNECTED TO NETWORK

(75) Inventors: Takayuki Chikada, Tokyo (JP); Yoshihiro Yano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 940 days.

(21) Appl. No.: 11/656,150

(22) Filed: Jan. 22, 2007

(65) Prior Publication Data

US 2007/0234405 A1   Oct. 4, 2007

(30) Foreign Application Priority Data

| Jan. 30, 2006 | (JP) | ............................. 2006-020014 |
| Jun. 7, 2006 | (JP) | ............................. 2006-158531 |
| Dec. 13, 2006 | (JP) | ............................. 2006-335728 |

(51) Int. Cl.
- G08B 1/08 (2006.01)
- G08B 13/14 (2006.01)
- G06F 9/46 (2006.01)
- G06F 15/02 (2006.01)
- G06F 7/00 (2006.01)

(52) U.S. Cl. ............................. 340/539.13; 340/572.1; 340/825.49; 705/9; 235/376

(58) Field of Classification Search ............ 340/539.13, 340/573.1, 573.4, 572.1–572.9, 825.49, 286.01–286.02, 340/686.6; 700/215–227; 705/7–11; 235/375–385
See application file for complete search history.

(56) References Cited

U.S. PATENT DOCUMENTS

| 5,870,029 | A | * | 2/1999 | Otto et al. ............... 340/825.36 |
| 6,452,498 | B2 | * | 9/2002 | Stewart .................... 340/573.1 |
| 7,289,814 | B2 | * | 10/2007 | Amir et al. ............... 455/456.1 |
| 7,323,991 | B1 | * | 1/2008 | Eckert et al. ............. 340/572.1 |
| 7,420,464 | B2 | * | 9/2008 | Fitzgerald et al. ....... 340/539.13 |
| 7,446,656 | B2 | * | 11/2008 | Blakeway ............... 340/539.21 |
| 7,463,143 | B2 | * | 12/2008 | Forr et al. .............. 340/539.13 |
| 2001/0005178 | A1 | * | 6/2001 | Stewart ...................... 342/457 |
| 2007/0008129 | A1 | * | 1/2007 | Soliman ................... 340/572.1 |

* cited by examiner

*Primary Examiner*—Benjamin C Lee
*Assistant Examiner*—Michael Shannon
(74) *Attorney, Agent, or Firm*—Ladas & Parry LLP

(57) ABSTRACT

Personal computers and other electronic devices that are connected by a network are installed in each individual office. An employee is enabled to use each individual electronic device by performing an authentication process using authentication information in an information recording medium (IC card) that is issued as an employee ID card. In the information recording medium is recorded a code C103 that indicates an electronic device that is to be a report target (for example, the employee's own personal computer 103 installed in a Chiba Branch). When this employee goes to a Tokyo Headquarters on business and performs the authentication process using the information recording medium in order to use an electronic device 101, the code C103 is read by the electronic device 101, a location information, "Tokyo Headquarters," which indicates the employee's current location, is transmitted via the network to the electronic device 103 that is the report target, and the current location (the installation location of the electronic device 101) is displayed on a screen of the electronic device 103. Tasks of self-declaring destinations are made unnecessary and detailed destination displays are enabled.

30 Claims, 8 Drawing Sheets

Fig.6
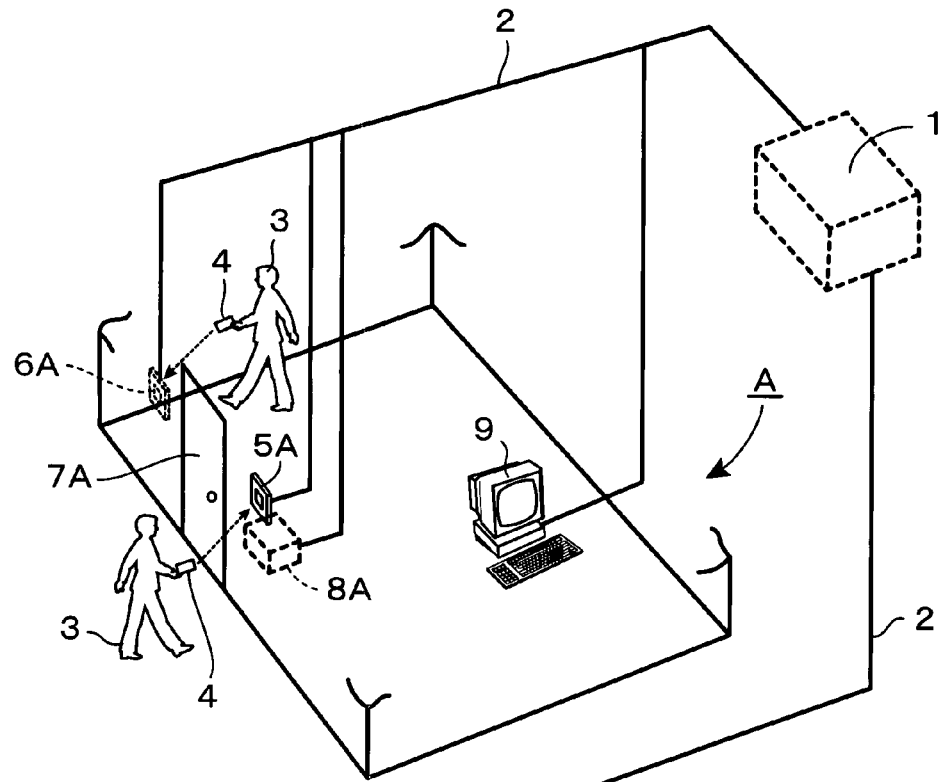
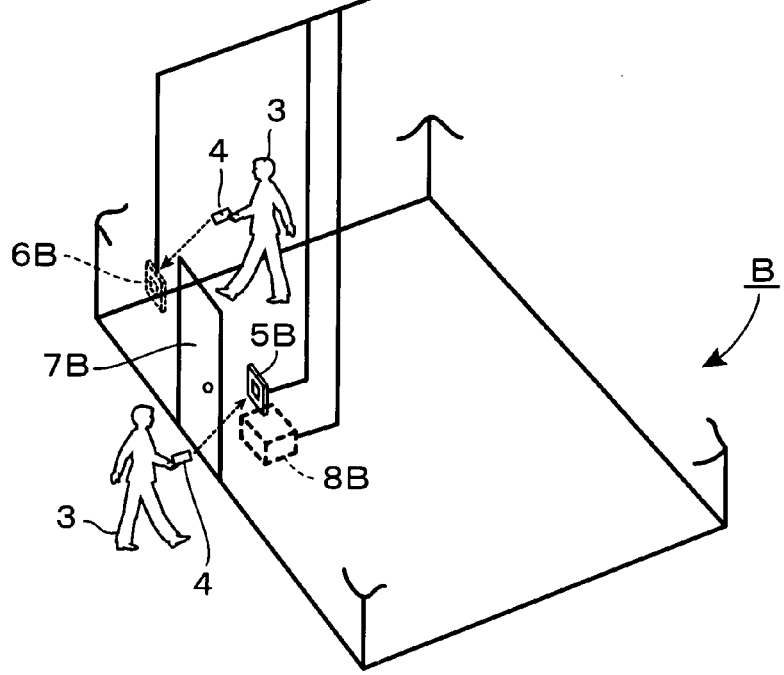

SYSTEM USING ELECTRONIC DEVICES CONNECTED TO NETWORK

BACKGROUND OF THE INVENTION

The present invention relates to a system using electronic devices connected to a network and particularly relates to an art of notifying a location of a user who uses a plurality of electronic devices installed at various locations.

Normally, social activities performed as a member of society accompany movement to various locations. Therefore, it is very important to notify one's destination and location to family, colleagues, friends, etc. Especially for a member of a corporate organization, activities that involve going to a headquarters, branch office, sales office, plant, and other various departments on business are part of the daily routine, and one's destination and location must be communicated to superiors, colleagues, subordinates, etc. As such communication purposes, a method of placing a memo indicating one's destination on one's desk, a method of writing one's destination on a bulletin board, etc., have been practiced commonly of old.

Meanwhile, today, when communication means using networks have spread, methods of transmitting messages concerning one's location and destination by sending and receiving electronic information have been proposed. For example, Japanese Patent Laid-open Publication No. 11-305695A discloses a system, with which a destination of a person who is preliminary set is displayed on an electronic bulletin board based on information input via an external communication line. Also, Japanese Patent Laid-open Publication No. 2002-49728 discloses a system that makes a personal computer show a bulletin board that indicates destinations of respective employees by utilizing a Web server. According to this system, destinations and locations of other members can be displayed and checked instantly on a personal computer or other terminal device.

In the above conventional systems, it is premised that information on destinations and locations of specific members is input and set in advance by the members themselves or by other members instructed by the members. For example, in a case of members scheduled to go to a headquarters on business, a task of inputting information, indicating the destination or location, such as "at the headquarters in the afternoon," as data in the system in advance must be performed. The system merely has a function of arranging information based on such self-declaration and presenting the information on an electronic bulletin board, etc. Put in another way, unless each individual member voluntarily makes a self-declaration, correct destinations cannot be presented.

Thus with such a system premised on voluntary self-declaration, an adverse effect of placing a task load of "declaring a destination" on each individual member arises in terms of operation, and because of this, the problem that destinations cannot be presented in detail occurs. For example, although a task load of making a self-declaration of the level of "at the headquarters in the afternoon" is not significant, if a mode of operation is implemented, in which detailed travel schedules, such as "in the 7th floor meeting room of the headquarters building from 1:00 to 1:40, in the meeting room of the Sales Headquarters 7th Section on the 3rd floor of the headquarters building from 1:50 to 3:00, in the No. 4 clean room on the 5th floor of building No. 4 of the Saitama Plant from 4:00 to 5:00," must be self-declared, the task load of each individual member inevitably becomes extremely large.

Meanwhile from the standpoint of another member who uses the destination information of a specific member, general information of the level of "at the headquarters in the afternoon" is not of much use. In a case where a specific member is to be contacted, it is difficult to make immediate contact with just information of the level of "at the headquarters in the afternoon," and it is more preferable to obtain destination information that is as detailed as possible.

SUMMARY OF THE INVENTION

Thus an object of the present invention is to provide a system that lightens the load of a declaration task concerning destinations and locations, which is performed by each individual member, and yet enables the destinations and locations to be presented in detail.

(1) The first feature of the present invention resides in a system using electronic devices connected to a network, the system comprising:

a plurality of electronic devices mutually connected by the network and respectively installed at mutually different locations; and a portable information recording medium, having a function, by which, when using an electronic device among at least a portion of the electronic devices, said electronic device is communicated with and made to perform authentication;

information indicating a specific electronic device that is to be a report target being recorded in the information recording medium; and at least one of the electronic devices having a function, by which, when in communication with the information recording medium, location information, indicating a location of said one, is transmitted via the network to the specific electronic device to be the report target that is recorded in the information recording medium.

(2) The second feature of the present invention resides in a system using electronic devices connected to a network according to the first feature, wherein a plurality of information recording media, in each of which a predetermined medium identification code is recorded, are prepared, and at least one of the electronic devices has a function, by which, when in communication with a specific information recording medium, a medium identification code recorded in the specific information recording medium, is transmitted along with the location information, via the network to the specific electronic device to be the report target that is recorded in the specific information recording medium.

(3) The third feature of the present invention resides in a system using electronic devices connected to a network, the system comprising:

a plurality of electronic devices mutually connected by the network and respectively installed at mutually different locations; and a portable information recording medium, having a function, by which, when using an electronic device among at least a portion of the electronic devices, said electronic device is communicated with and made to perform authentication;

said information recording medium comprising:

a communicating unit for communicating with each of the electronic devices;

an authentication information storage unit, storing authentication information necessary for making at least a portion of the electronic devices perform correct authentication; and a report target device registration unit, storing information indicating a report target device;

at least one of the electronic devices comprising:

a communicating unit for communicating with the information recording medium;

an authentication unit, using authentication information stored in the information recording medium in communication to authenticate the information recording medium and permitting use of said one when a correct authentication result is obtained;

a device identification code storage unit, storing a device identification code provided to said one to enable the respective electronic devices to identify each other on the network;

a location information storage unit, storing location information indicating a location of installation of said one; and a location information transmitting unit, reading out a device identification code from the report target device registration unit of the information recording medium in communication, and transmitting, via the network, the location information stored in the location information storage unit, to another electronic device specified by the read-out device identification code; and the electronic devices including a designatable electronic device which can be designated as a report target, said designatable electronic device comprising:

a device identification code storage unit, storing a device identification code provided to said designatable electronic device to enable the respective electronic devices to identify each other on the network; and a location information presenting unit, storing location information transmitted via the network to said designatable electronic device and presenting the location information by a predetermined method.

(4) The fourth feature of the present invention resides in a system using electronic devices connected to a network according to the third feature, wherein at least one of the electronic devices comprises:

a report target writing unit, performing a process of writing a device identification code concerning a specific electronic device into the report target device registration unit in an information recording medium in communication.

(5) The fifth feature of the present invention resides in a system using electronic devices connected to a network according to the third feature, wherein a designatable electronic device comprises:

a report target writing unit, having a function of writing a device identification code of said designatable electronic device stored in the device identification code storage unit, into the report target device registration unit in an information recording medium in communication.

(6) The sixth feature of the present invention resides in a system using electronic devices connected to a network according to the fifth feature, wherein a designatable electronic device has a function to input a user request, and when said request is that said designatable electronic device itself be designated as a report target device, the report target writing unit executes a process of writing a device identification code of said designatable electronic device into the report target device registration unit in an information recording medium in communication, and when said request is that another designatable electronic device besides said designatable electronic device be designated as a report target device, the report target writing unit executes a process of writing a device identification code of said another designated electronic device into the report target device registration unit in an information recording medium in communication.

(7) The seventh feature of the present invention resides in a system using electronic devices connected to a network according to the third feature, wherein a plurality of information recording media, having mutually different predetermined medium identification codes recorded therein, are prepared, the location information transmitting unit reads out a medium identification code along with a device identification code from an information recording medium in communication and transmits, via the network, location information stored in the location information storage unit, and the read-out medium identification code to another electronic device specified by the read-out device identification code, and the location information presenting unit, upon transmission of location information and a medium identification code via the network, presents the location information and the medium identification code or a user name associated with the medium identification code.

(8) The eighth feature of the present invention resides in a system using electronic devices connected to a network according to the seventh feature, wherein the authentication information, stored in the authentication information storage unit, or a portion of the authentication information is used as the medium identification code.

(9) The ninth feature of the present invention resides in a system using electronic devices connected to a network according to the third feature, wherein a plurality of designatable electronic devices are prepared, the report target device registration unit in the information recording medium is arranged to enable writing of device identification codes concerning a plurality of said designatable electronic devices, and the location information transmitting unit, in a case where a plurality of device identification codes are written in the report target device registration unit of an information recording medium in communication, performs information transmission to each of the electronic devices respectively specified by the individual device identification codes.

(10) The tenth feature of the present invention resides in a system using electronic devices connected to a network according to the third feature, wherein the location information presenting unit presents only newest location information transmitted via the network (in a case where location information is transmitted along with a medium identification code, newest location information for each individual medium identification code).

(11) The eleventh feature of the present invention resides in a system using electronic devices connected to a network according to the third feature, wherein the location information presenting unit presents a plurality of pieces of location information in a listed manner, transmitted via the network, in an order that is in accordance with a time sequence (in a case where location information is transmitted along with a medium identification code, in an order that is in accordance with a time sequence for each individual medium identification code).

(12) The twelfth feature of the present invention resides in a system using electronic devices connected to a network according to the third feature, wherein only when a user provides an instruction for presenting location information to an electronic device that is designated as a report target, the location information presenting unit in the electronic device performs presentation of the location information on a display screen of the electronic device.

(13) The thirteenth feature of the present invention resides in a system using electronic devices connected to a network according to the third feature, wherein when an electronic device that is designated as a report target enters a rest mode, the location information presenting unit in the electronic device automatically performs presentation of the location information on a display screen of the electronic device.

(14) The fourteenth feature of the present invention resides in a system using electronic devices connected to a network according to the third feature, wherein a location information presenting unit having a function of presenting the location information by audio.

(15) The fifteenth feature of the present invention resides in a system using electronic devices connected to a network according to the third feature, wherein an electronic bulletin board, provided with a predetermined device identification code and enabled to receive location information transmitted to itself via the network and present the location information, is provided as a designatable electronic device.

(16) The sixteenth feature of the present invention resides in a system using electronic devices connected to a network according to the third feature, wherein a telephone, provided with a predetermined device identification code and having a function of receiving location information transmitted to itself via the network and transferring a call made to itself to another telephone installed at a location specified by the location information, is provided as a designatable electronic device.

(17) The seventeenth feature of the present invention resides in a system using electronic devices connected to a network according to the third feature, wherein the designatable electronic device deletes, on the basis of a user instruction or establishment of a predetermined condition, location information received in the past and prevents subsequent presentation concerning the location information.

(18) The eighteenth feature of the present invention resides in a system using electronic devices connected to a network according to the third feature, wherein at least any one or plurality of the electronic devices is or are provided with a function of deleting, on the basis of a user instruction or establishment of a predetermined condition, predetermined device identification codes recorded in the report target device registration unit in the information recording medium.

(19) The ninteenth feature of the present invention resides in a system using electronic devices connected to a network according to the third feature, wherein a network using an IP protocol is used as the network and IP addresses are used as the device identification codes.

(20) The twentieth feature of the present invention resides in a system using electronic devices connected to a network according to the third feature, wherein the location information transmitting unit performs information transmission by means of e-mail.

(21) The twenty-first feature of the present invention resides in a system using electronic devices connected to a network according to any one of the first to the twentieth features, wherein computers, printers, copiers, or other office furniture or equipment, electronic locks, or electronic bulletin boards are used as a portion of the electronic devices.

(22) The twenty-second feature of the present invention resides in a program for making a computer function as an electronic device in a system according to any one of the first to the twentieth features.

(23) The twenty-third feature of the present invention resides in a method of presenting a location of a user using a system including:

a plurality of electronic devices mutually connected by a network and respectively installed at mutually different locations; and a portable information recording medium, having a function, by which, when using an electronic device among at least a portion of the electronic devices, said electronic device is communicated with and made to perform authentication;

the method comprising:

a step wherein the information recording medium records information indicating a "specific electronic device on which a presentation of location is to be performed;"

a step wherein, when an electronic device communicates with the information recording medium, said electronic device transmits, via the network, location information, indicating its own location, to the "specific electronic device on which the presentation of location is to be performed," recorded inside the information recording medium; and a step wherein an electronic device, receiving the location information, presents the location information.

(24) The twenty-fourth feature of the present invention resides in a location notification system comprising: a plurality of fixed devices, installed at mutually different locations; and a portable mobile device, having a function of communicating with any of the fixed devices by being brought within a communicable area of the fixed device; and wherein the mobile device has recorded therein information indicating a specific fixed device, and each of the fixed devices has a function, by which, when in communication with the mobile device, a location information, indicating a location of the fixed device itself, is transmitted to the specific fixed device recorded in the mobile device.

(25) The twenty-fifth feature of the present invention resides in a screen lock absence display system, displaying, on a screen-locked personal computer, location information of a user of the personal computer, the screen lock absence display system comprising:

a personal computer, having a function of performing a screen lock of not accepting an operation input for a primary process until a lock release process is performed by a user and a function of displaying location information, received from the exterior, on a display in a screen-locked state;

a portable information recording medium, having recorded therein identification information that specifies the personal computer or the user thereof;

reading devices, each being installed near each of an exit and an entrance of a plurality of rooms and reading the identification information recorded in the information recording medium when entry into or exit from any of the rooms is performed;

a door locking/unlocking device that, based on identification information read by a reading device of a specific room, controls a lock state of a door of the specific room; and an information processing device that, based on the identification information read by a reading device of a specific room, specifies the personal computer and transmits room information, indicating the specific room, as the location information to the personal computer.

(26) The twenty-sixth feature of the present invention resides in a screen lock absence display system according to the twenty-fifth feature, comprising:

an entry reading device, reading the identification information recorded in the information recording medium when entry into each room is performed, and an exit reading device, reading the identification information recorded in the information recording medium when exit from each room is performed, and wherein the information processing device transmits location information, indicating entry into a room, when the entry reading device has read the identification information and transmits location information, indicating exit from a room, when the exit reading device has read the identification information.

(27) The twenty-seventh feature of the present invention resides in a screen lock absence display system according to the twenty-fifth feature, wherein the information processing device is provided with:

an employee information database, indicating door unlocking authorities associated with identification information;

an authentication means, using the employee information database to authenticate, based on identification information read by a reading device of a specific room, the door unlocking authority for the specific room; and an unlocking signal transmitting means, transmitting an unlocking signal to the door locking/unlocking device of the specific room when a correct authentication result obtained by the authentication means; and the door locking/unlocking device performs unlocking upon receiving the unlocking signal.

(28) The twenty-eighth feature of the present invention resides in a screen lock absence display system according to the twenty-fifth feature, wherein identification information specifying the user of the personal computer is recorded in the portable information recording medium, an equipment information database, associating the identification information with the personal computer, is prepared in the information processing device, and the information processing device uses the equipment information database to specify the personal computer to be a transmission destination of the location information.

(29) The twenty-ninth feature of the present invention resides in a screen lock absence display system according to the twenty-fifth feature, wherein near an exit of a room in which a predetermined personal computer is installed, an exit reading device, which reads the identification information from the information recording medium when exit from the room, is provided, and when a personal computer specified based on the identification information read by the exit reading device is a predetermined personal computer, the information processing device performs a process of making a screen lock of the predetermined personal computer be started up.

(30) The thirtieth feature of the present invention resides in a screen lock absence display system according to the twenty-fifth feature, wherein the portable information recording medium is a contactless IC card and the reading devices are IC card readers.

BRIEF DESCRIPTION OF THE DRAWINGS

FIG. 6 is a schematic, transparent perspective view of an embodiment, in which the present invention is applied to a screen lock absence display system;

DETAILED DESCRIPTION OF THE PREFERRED EMBODIMENTS

The present invention shall now be described based on illustrated embodiments.

Section 1. Basic Concepts of the Present Invention

An object of a system according to the present invention is to notify a location of a specific member to another member. However, with the present invention, instead of constructing a new hardware system to achieve this object, a method of using an existing hardware system is employed. That is, the present invention employs a method whereby a system using electronic devices that includes: a plurality of electronic devices, installed at mutually different locations; and a portable information recording medium, having a function, by which, when any of the electronic devices is used, the electronic device is communicated with and made to perform authentication; and is constituted by connecting the respective electronic devices by a network is used to present a location of a user who uses the system.

Figure 1:
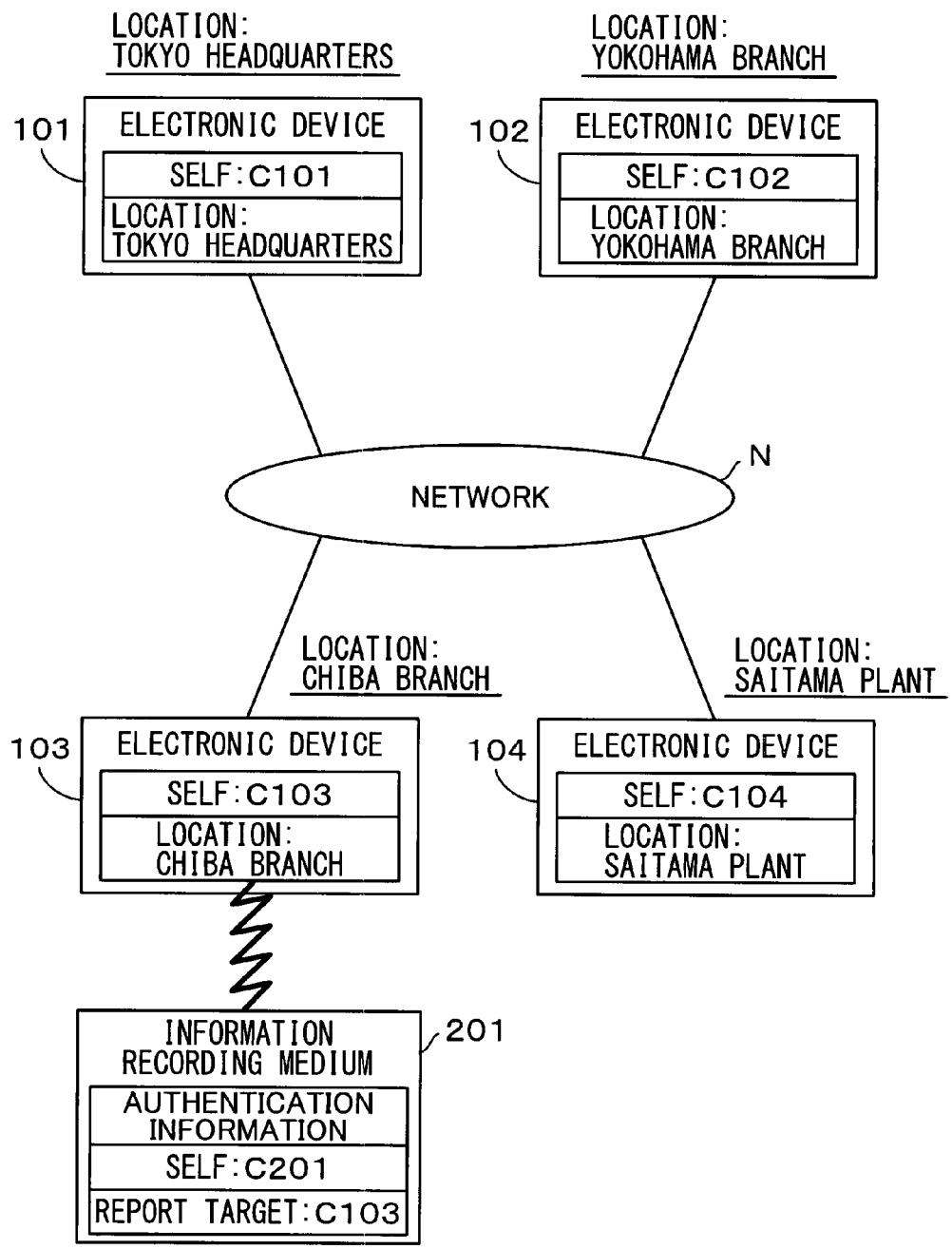
FIG. 1 is a block diagram for describing basic concepts of the present invention.

An example of such a system using electronic devices is shown in FIG. 1. With the illustrated example, a state where four electronic devices 101 to 104 are respectively connected to a network N is shown. The four electronic devices 101 to 104 are installed at mutually different locations and can communicate with each other via the network N. In the description that follows, it shall be deemed that the four electronic devices 101 to 104 are installed at mutually different facilities as equipment of a specific company and are each constituted of a personal computer.

Specifically, as illustrated, the electronic device 101 is a personal computer installed at a Tokyo Headquarters, the electronic device 102 is a personal computer installed at a Yokohama Branch, the electronic device 103 is a personal computer installed at a Chiba Branch, and the electronic device 104 is a personal computer installed at a Saitama Plant. Although obviously, not just one personal computer but a larger number of personal computers and other electronic devices are installed at each location in actuality, here, for the sake of description, a simple model, in which just a single personal computer is installed at a single location, shall be considered. The network N may be an internal LAN or the internet.

Meanwhile, it shall be deemed that an information recording medium is issued as an employee ID card to each employee of this company. Here, it shall be deemed that an information recording medium 201 is issued to a specific employee A as illustrated. The information recording medium 201 is a portable medium having a function, by which, when any of the electronic devices 101 to 104 is used, the electronic device being used is communicated with and made to perform authentication. Specifically, an IC card is employed. Needless to say, in putting the present invention into practice, the information recording medium 201 does not necessarily have to be an IC card, and a cellular phone, PDA, or other device may be used instead as the information recording medium 201. That is, any medium may be used as the information recording medium 201 as long as it is a portable medium having a function of communicating with an electronic device to be used and making the electronic device perform authentication. However, because an increasing number of companies are issuing IC cards as employee ID cards recently, an example of using an employee ID card, constituted of an IC card, as it is as the information recording medium 201 shall be described here.

Also here, it shall be deemed that the employee A is a staff of the Chiba Branch, has a desk inside the building of the Chiba Branch, and the electronic device 103 is issued as a desktop personal computer for dedicated use by the employee A. The employee A thus normally performs work using the electronic device 103 at his desk in the Chiba Branch. Moreover, it shall be deemed that the employee A is provided with authority to use, as necessary, the electronic device 101 installed at the Tokyo Headquarters, the electronic device 102 installed at the Yokohama Branch, and the electronic device 104 installed at the Saitama Plant, and when the employee A goes to any of these locations on business, the employee A can perform work using the electronic device installed at each location.

Obviously when a person uses any of the electronic devices, an authentication of whether or not the person is given the authority to use the electronic device is performed. Such authentication is performed using the information recording medium 201. As illustrated, authentication information unique to the owner is recorded in the information recording medium 201. Also, the information recording medium 201 has a function of communicating with any of the electronic devices 101 to 104 and, in using a specific electronic device, the employee A makes the electronic device to be used and the information recording medium 201 communicate and makes an authentication process be performed. Obviously, use of the electronic device is enabled only when authentication is performed correctly.

FIG. 1 shows a state where the electronic device 103 installed at the Chiba Branch (the desktop personal computer issued to the employee A) and the information recording medium 201 are made to communicate. Because as mentioned above, the IC card, issued as the employee ID card, is used as the information recording medium 201 in the present example, the electronic device 103 (personal computer) is equipped with an IC card reader/writer, and the employee A puts the two components in the communicable state by inserting the employee ID card in the reader/writer. Although in a case where a contact type IC card is used as the information recording medium 201, the communication between the two components is performed via physical contact of electrodes, in a case where a contactless IC card is used, the communication between the two components is performed by wireless communication.

In starting the use of the electronic device 103 (personal computer), the employee A first inserts the information recording medium 201 (employee ID card) in the reader/writer provided in the electronic device 103 to perform a predetermined login procedure (also referred to as a "logon" procedure). In this login procedure, the electronic device 103 performs a process of authenticating that the information recording medium 201 is a legitimate medium. Various processes are known as examples of such an authentication process.

For example, a process is performed in which a random number data, generated at the electronic device 103 side, is provided to the information recording medium 201, this random number data is encrypted using unique authentication information, recorded in the information recording medium 201, to generate encrypted data, and the encrypted data is returned to the electronic device 103 side, at which whether or not the encrypted data is correct is judged. As a specific example, the unique authentication information, recorded in the information recording medium 201, is prepared in the electronic device 103 side as well (or, the unique authentication information may be prepared in a server apparatus connected to the network N) and because the encrypted data can then be generated using the same authentication information at the electronic device 103 side as well, whether or not this generated encrypted data matches the encrypted data returned from the information recording medium 201 is checked.

Although the above-described authentication process is performed for the information recording medium 201 to be authenticated as the correct medium by the electronic device 103 side, normally, a reverse authentication process, that is, a process, by which the electronic device 103 is authenticated as the correct device by the information recording medium 201 side, is also executed, and the login procedure is completed only when both components authenticate each other as being the correct device. Also normally in this login procedure, the employee A is requested to input a password. Because such processes related to the login procedure are known arts, detailed description thereof shall be omitted here.

An important point of the present invention is that an authentication procedure using the information recording medium 201 is required when the employee A uses the electronic device 103, and in performing work at his/her own desk in the Chiba Branch, the employee A must connect the information recording medium 201 to the electronic device 103 and make the authentication be performed as illustrated. Although a mode of operation is possible in which the information recording medium 201 can be extracted from the electronic device 103 once the authentication succeeds and the login procedure is completed, in general, a mode of operation, in which the information recording medium 201 is kept connected to the electronic device 103 until the logoff procedure is performed, is employed in many cases.

When the employee A goes to the Tokyo Headquarters, although he/she can use the electronic device 101, he/she must perform the login procedure by connecting the information recording medium 201 to the electronic device 101 and making the authentication process be performed in this case as well. Although the employee A can thus use any of the electronic devices 101 to 104 as necessary, the authentication process using the information recording medium 201 is required for use.

Although the general arrangement of the system using electronic devices shown in FIG. 1 was described above, a system using electronic devices with such a configuration in itself is a known system and is actually used in many companies. Needless to say, such a system using electronic devices in itself is not a system that is constructed for the purpose of notifying the locations of employees but is a system constructed for performing various business processes while performing mutual exchange of information using the network N. A basic point noted in the present invention is: "to use such a system using electronic devices to make an additional process, of notifying the locations of employees, be executed."

As mentioned above, although the employee A can use any of the electronic devices 101 to 104 as necessary, the authentication process using the information recording medium 201 is required for use. Put in another way, when the authentication process using the information recording medium 201 (employee ID card of the employee A) is executed on a specific electronic device, this means that the employee A is about to use the specific electronic device and the location of the employee A at that point in time is the installation location of the specific electronic device. By making use of such a characteristic, the system can ascertain the location of the employee A and notify information concerning the location to an arbitrary electronic device, even if the employee A does not voluntarily perform a declaration task concerning his/her destination or location.

The present invention is based on such basic concepts, and in order to perform such notification of location, each of the electronic devices 101 to 104 has stored therein a device identification code, provided to specify the device itself, and location information, indicating the location of the device itself.

For example, in FIG. 1, the small block, "Self: C101," indicated inside the block of the electronic device 101 indicates that a device identification code, "C101," for specifying the electronic device 101 itself is stored in the electronic device 101 (the characters, "Self:," indicated in the figure are for clarifying that the code, "C101," is a code that indicates the device itself on the figure and are unnecessary in actual practice). Also, the small block, "Location: Tokyo Headquarters," indicated inside the block of the electronic device 101 indicates that a location information, "Tokyo Headquarters," which indicates the installation location of the electronic device 101 itself is stored in the electronic device 101 (the characters, "Location:" indicated in the figure are for clarifying that the code, "Tokyo Headquarters," is information indicating the installation location of the device itself on the figure and are unnecessary in actual practice). The same applies to the respective small blocks indicated inside the blocks of the other electronic devices 102 to 104 as well.

With the present invention, for the location of a user (the employee A in the present example) to be presented on a specific electronic device, the following three steps are executed. In a first step, a process of recording information, indicating the "specific electronic device on which the presentation of location is to be performed," in the information recording medium 201 is performed. Here, the "specific electronic device on which the presentation of location is to be performed" shall be referred to as the "report target."

FIG. 1 shows an example where the three types of information of: "authentication information"; "Self: C201"; and "Report target: C103"; are stored in the information recording medium 201. Obviously because the information recording medium 201 is an IC card that functions as the employee ID card of the employee A, various other information are recorded therein and the abovementioned three types of information are the information among these that are involved with the present invention.

Here, the "authentication information" is used in the authentication process performed with the electronic device to be used as described above, and normally, authentication information, constituted of a code unique to each individual employee ID card, is recorded. Meanwhile, "C201" is a medium identification code that identifies the information recording medium 201 itself, and as this code, a code that is unique to each individual information recording medium is provided (the characters, "Self:" indicated in the figure are for clarifying that the code, "C201," is a code that indicates the device itself on the figure and are unnecessary in actual practice). "Report target: C103" is the code recorded in the above-described first step and indicates that the "specific electronic device on which the presentation of location is to be performed (report target)" for the employee A is the electronic device 103 that is specified by the device identification code "C103."

The user (the employee A in the present example) can freely determine which electronic device is to be set as the "report target." As shall be described below, because the location of oneself is notified to the electronic device that is set as the "report target," an electronic device that is installed at a location to which one wishes to notify one's location is set as the "report target." The illustrated example shows a case where the employee A has set the personal computer (the electronic device 103), installed on his/her own desk at the Chiba Branch, as the "report target." A "report target" can be set using any of the electronic devices to write a predetermined device identification code in an information recording medium. The characters, "Report target:" indicated in the figure are for clarifying that the code, "C103," is a device identification code that indicates the electronic device that is to be the "report target" on the figure and are unnecessary in actual practice.

A second step that follows is executed when the authentication for enabling a user (the employee A in the present example) to use a specific electronic device is performed. That is, the second step is a process, which is executed by each electronic device and in which, when an electronic device to be used communicates with the information recording medium 201, the electronic device transmits location information indicating its own location via the network N to the "specific electronic device on which the presentation of location is to be performed (report target)," recorded inside the information recording medium 201.

As an example, a case where the employee A goes to the Tokyo Headquarters on business and uses the electronic device 101 shall be considered. In this case, because the employee A must perform the login procedure on the electronic device 101 by using the information recording medium 201, carried as the employee ID card, as described above, communication is obviously performed between the information recording medium 201 and the electronic device 101 and the authentication process using the authentication information is executed. In this process, the electronic device 101 reads the device identification code, "C103," which is recorded in the information recording medium 201 and indicates the "report target," and thereby recognizes that the "report target" is the electronic device 103. The electronic device 101 then transmits the location information, indicating its own location, to the electronic device 103, which is set as the "report target," via the network N. In the illustrated example, a code constituted of the character string, "Tokyo Headquarters," stored in advance in the electronic device 101, is transmitted as the location information.

Although such a process of the second step may be executed before authentication is performed between the electronic device 101 and the information recording medium 201, for practical use, the process of the second step is preferably executed only after authentication has been performed correctly between the two components to prevent transmission of a false location information.

A last, third step is a process, which is executed by the electronic device that is set as the "report target" and in which the electronic device that received the location information via the network N presents the location information. With the above example, because the code constituted of the character string, "Tokyo Headquarters," is transmitted from the electronic device 101, installed at the Tokyo Headquarters, to the electronic device 103 (report target), installed at the Chiba Branch, the electronic device 103 performs a process of displaying this code on a display screen. Obviously in actuality, the display is preferably performed in a form of an appropriate message, such as "Presently at the Tokyo Headquarters."

When presentation of the location is made by such a method, a colleague present at the Chiba Branch can view the display screen of the electronic device 103 (personal computer) installed on the desk of the employee A and recognize the location of the employee A. Moreover, the employee A him/herself does not have to perform any task of voluntarily declaring his/her location for such a location presentation to be made. Although obviously the electronic device that is to be the "report target" must be set in advance in the information recording medium 201 (first step), once this setting is made, the location of oneself can be presented on the electronic device that is the "report target" without having to perform any special tasks thereafter.

The system according to the present invention also provides the merit that the introduction cost can be kept extremely low because an existing system using electronic devices that are network-connected can be used as it is to perform presentation of locations of users. Presently, the operations of many companies are executed by systems of network-connected computers, and from security considerations, authentication using. a company ID card or other information recording medium is performed in logging into individual terminal devices (electronic devices) in such systems. By the present invention, the functions of a location presenting system can be realized in such an existing system simply by adding some software. Specifically, the system according to the present invention can be realized by simply incorporating dedicated programs for executing the above-described first step to third step in the respective electronic devices and in the information recording medium as necessary.

The system shown in FIG. 1 can thus be said to be a system that can be constructed using an existing system that includes: the plurality of electronic devices 101 to 104, installed at mutually different locations; and the portable information recording medium 201, having the function, by which, when an electronic device among the electronic devices 101 to 104 is used, the electronic device is communicated with and made to perform authentication; and where the electronic devices 101 to 104 are connected mutually by the network.

That is, in such an existing system, information indicating the specific electronic device that is to be the report target (in the illustrated example, the device identification code, "C103") is recorded in advance in the information recording medium 201, and each of the electronic devices 101 to 104 is provided with the function by which, upon communication with the information recording medium 201, location information, indicating the location of the device itself, is transmitted via the network N to the specific electronic device (in the illustrated example, the electronic device 103) that is the report target recorded in the information recording medium 201. Because the location information indicating the location of a user is thereby notified automatically to the electronic device that is the report target, the location information can be presented as necessary.

Although for the sake of description, just the information recording medium 201, issued as the employee ID card of the employee A, is shown in FIG. 1 and only the case of notifying the location of the employee A was described, obviously in actuality, an information recording medium is issued as an employee ID card to each individual employee. That is, for example, an information recording medium 202 is issued to another employee B, an information recording medium 203 is issued to another employee C, and so forth. In the process of the above-described first step, each employee sets a desired electronic device as the "report target" in his/her own information recording medium. The location of the employee B is thus presented on the "report target" set in the information recording medium for employee B, and the location of the employee C is presented on the "report target" set in the information recording medium for employee C.

There may be a case where a plurality of employees set the same electronic device as the "report target." For example, in a case where the electronic device 103, installed at the Chiba Branch, is a personal computer that is shared by the employees A, B, and C, all of the employees A, B, and C may set the electronic device 103 as the "report target." In this case, for example, when the location information, "Tokyo Headquarters," is transmitted from the electronic device 101 to the electronic device 103, it cannot be discerned whom among the employees A, B, and C the information indicates the location of.

Thus for practical use, in each information recording medium, a predetermined medium identification code for specifying itself is recorded to enable accommodation of cases such as that described above. For example, with the example of FIG. 1, the information recording medium 201 has recorded therein a medium identification code, "C201," that indicates the recording medium itself Arrangements are made so that upon communication with a specific information recording medium, each electronic device executes a process of transmitting, via the network, the location information, indicating its own location, and the medium identification code, recorded in the information recording medium, to the specific electronic device to be the report target that is recorded in the information recording medium.

For example, it shall be deemed that the employee A performs the login procedure on the electronic device 101 at the Tokyo Headquarters in the example shown in FIG. 1. In this case, first the electronic device 101 uses the "authentication information" inside the information recording medium 201 to perform the authentication process and then executes a process of reading the medium identification code, "C201," and the device identification code, "C103," indicating the report target, that are recorded in the information recording medium 201. The electronic device 101 then performs a process of transmitting the location information, "Tokyo Headquarters," indicating the installation location of itself, and the read medium identification code, "C201," to the electronic device 103 that is the report target.

By arranging such processes to be performed, when the employee A performs the login procedure on the electronic device 101 at the Tokyo Headquarters, not just the location information of "Tokyo Headquarters" but the medium identification code of "C201" is also transmitted to the electronic device 103 of the Chiba Branch and thus information that the location of the employee, who owns the employee ID card specified by the medium identification code, "C201," is the "Tokyo Headquarters" can be presented. Obviously, by arranging a list that indicates the correspondence between the medium identification code and employee name to be referenced, the electronic device 103 can recognize that the employee A is the employee who owns the employee ID card specified by the medium identification code, "C201," and thus a message, such as "Employee A is presently at the Tokyo Headquarters," can be presented. Obviously, the locations of the employee B and the employee C can be presented in likewise manner.

Or, if in place of a code, such as "C201," a character code, such as "Employee A," that indicates a name is used as the medium identification code recorded inside the information recording medium 201, because the medium identification code of "Employee A" will then be transmitted to the electronic device 103 along with the location information of "Tokyo Headquarters," it becomes possible to present a message, such as "Employee A is presently at the Tokyo Headquarters," without referencing a list, etc.

By thus recording a medium identification code, such as "C201" or "Employee A," inside the information recording medium 201, cases where a plurality of employees set the same electronic device as the "report target" can be accommodated. Oppositely, if there are no cases where a plurality of employees set the same electronic device as the "report target," a medium identification code does not necessarily have to be stored inside information recording medium 201.

For example, if the electronic device 103 is a personal computer dedicated to the employee A and there is no possibility for another employee to set this personal computer as a "report target," the recording of the illustrated medium identification code of "C201" can be omitted without any problem. In this case, because the location information, which is transmitted with the electronic device 103 as the "report target," is necessarily information indicating the location of the employee A, even if the message displayed on the electronic device 103 is only information indicating a location, such as "Presently at the Tokyo Headquarters," it is clear that this message indicates the location of the employee A.

Thus in putting the present invention into practice, the recording of the medium identification code at the information recording medium side and the transmitting of the medium identification code to the "report target" are not essential matters.

Section 2. Specific Arrangement of the System According to the Present Invention The basic concepts of the present invention were described with reference to FIG. 1 in Section 1 above. Here, a more specific arrangement example of the electronic device and the information recording medium in the system shown in FIG. 1 shall be described.

Figure 2:
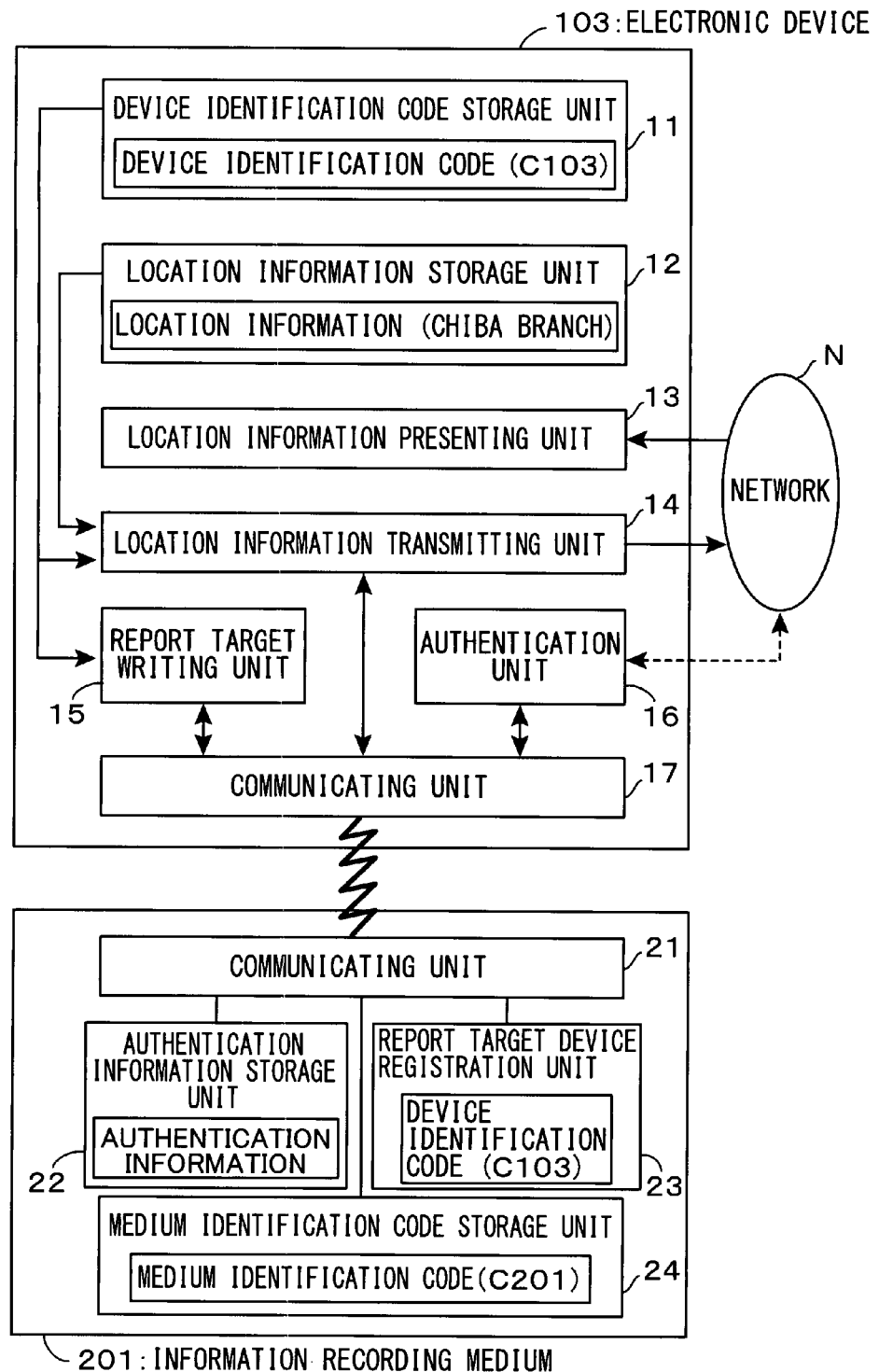
FIG. 2 is a block diagram of an arrangement of an electronic device and an information recording medium according to a basic embodiment of the present invention.

FIG. 2 is a block diagram of the arrangement of the electronic device and the information recording medium according to the basic embodiment of the present invention, and shows specific arrangement examples of the electronic device 103 and the information recording medium 201, shown at a lower left portion of FIG. 1. As shown in an upper stage of FIG. 2, the electronic device 103 includes components 11 to 17 that are respectively indicated by blocks, and as shown in a lower stage of FIG. 2, the information recording medium 201 includes components 21 to 24 that are respectively indicated by blocks.

The illustrated components 11 to 17, indicated as blocks, are just the components of the electronic device 103 that are involved with the present invention, and the electronic device 103 includes various other components besides these in accordance with its functions. For example, because in the example described here, the electronic device 103 is a desktop personal computer, it includes a CPU, a memory, a hard disk device, a display device, a keyboard, a mouse, and other various components. With each of the components 11 to 17, a specific function of the electronic device 103 is treated as a single component, and in actuality, these components are realized by incorporating dedicated software in the various abovementioned hardware that constitute the personal computer.

Likewise, the illustrated components 21 to 24, indicated as blocks, are just the components of the information recording medium 201 that are involved with the present invention, and the information recording medium 201 includes various other components besides these in accordance with its functions. For example, because in the example described here, the information recording medium 201 is an IC card that is issued as an employee ID card to the employee A, it includes such hardware as a CPU, a memory, etc., and in the memory are stored various programs and data necessary for providing the functions of an employee ID card. With each of the components 21 to 24, a specific function of the information recording medium 201 is treated as a single component, and in actuality, these components are realized by incorporating dedicated software in the hardware that constitute the IC card.

A communicating unit 21, which is a component of the information recording medium 201, serves a function of communicating with an electronic device. As mentioned in Section 1, the communication between the information recording medium 201 and an electronic device may be a contact type communication, in which electrodes are put in physical contact, or a contactless type communication using wireless, and the communicating unit 21 is constituted of hardware and software inside the IC card that are involved with the communication process. Meanwhile, an authentication information storage unit 22, a report target device registration unit 23, and a medium identification code storage unit 24 are each constituted of an area of the memory inside IC card.

The authentication information storage unit 22 is a component that stores authentication information necessary for making an electronic device perform correct authentication, and as mentioned in Section 1, an electronic device uses the authentication information stored in the authentication information storage unit 22 to authenticate that the information recording medium 201 is a correct medium.

The report target device registration unit 23 is a component that stores information indicating the report target device. Specifically, the device identification code that indicates the specific electronic device, which is set as the "report target," is stored. In the figure, an example where the device identification code of "C103" (the identification code of the electronic device 103) is stored is shown, and this signifies that the electronic device 103 is registered as the "report target."

The medium identification code storage unit 24 is a component that stores the medium identification code for identifying the information recording medium 201 itself. In the figure, an example where the medium identification code of "C201" (the identification code of the information recording medium 201) is stored is shown. An information recording medium is supplied as an employee ID card to each individual employee, and in the medium identification code storage unit 24 of each individual information recording medium, a predetermined medium identification code that differs from other medium identification codes is recorded. If confusion among employees of the same surname and same first name does not occur, a name, such as "Employee A," may be used as the medium identification code as described above.

Meanwhile, the communicating unit 17, which is a component at the electronic device 103 side, serves a function of communicating with an information recording medium, and in actuality, is constituted of hardware and software of the personal computer and its peripheral devices (a reader/writer in the present example) that are involved with the communication process.

An authentication unit 16 serves a function of using the authentication information, stored in an information recording medium in communication, to authenticate the information recording medium and enable use of the electronic device when a correct authentication result is obtained. The illustrated example shows a state where the employee A has inserted the information recording medium 201, which is an employee ID card, in the reader/writer at the electronic device 103 to log into the electronic device 103 and communication is being performed between the information recording medium 201 and the electronic device 103. In such a state, the authentication unit 16 uses the authentication information, stored inside the authentication storage unit 22, to authenticate whether or not the information recording medium 201 is a legitimate medium in the present system.

In the figure, a broken line arrow is drawn between the authentication unit 16 and the network N, and this indicates that if necessary for the authentication process, the authentication unit 16 can access an unillustrated server device, etc., via the network N. Obviously if the authentication unit 16 has a function of performing authentication solitarily, access via the network N is unnecessary.

A device identification code storage unit 11 is a component that stores the device identification code provided to the electronic device itself to enable mutual identification among electronic devices on the network N, and a location information storage unit 12 is a component that stores the location information indicating the location at which the electronic device itself is installed. In actuality, both of these are constituted by storage areas of a hard disk device, etc., of the personal computer constituting the electronic device 103. The figure illustrates an example where the device identification code of "C103" (identification code of the electronic device 103) and the location information of "Chiba Branch" (installation location of the electronic device 103) are stored.

A location information transmitting unit 14 serves a function of reading the device identification code, written in the report target device registration unit 23 of the information recording medium 201 in communication, and transmitting the self location information, stored in the location information storage unit 12, via the network N to a separate electronic device specified by the device identification code that has been read. This function is a function of performing the process corresponding to the second step, described in Section 1.

However, in the case of the example shown in FIG. 2, because the electronic device 103 itself is the "report target," the transmission of location information by the location information transmitting unit 14 is not actually performed. That is, in cases where the device identification code, "C103," read from the report target device registration unit 23, matches the device identification code, "C103," stored in the device identification code storage unit 11, the location information transmitting unit 14 recognizes itself to be the "report target" and avoids executing the transmission of the location information.

The location information transmitting unit 14 actually performs the process corresponding to the second step in a case where, for example, the employee A goes to the Tokyo Headquarters on business and logs into the electronic device 101. In this case, because the electronic device indicated in the upper stage of FIG. 2 is the electronic device 101 installed at the Tokyo Headquarters, the device identification code, "C103," read from the report target equipment registration unit 23 does not match the device identification code, "C101," stored in the device identification code storage unit 11. The location information transmitting unit 14 thus transmits, via the network N, the self location information of "Tokyo Headquarters," stored in the location information storage unit 12, to the separate electronic device 103 set as the "report target."

In this process, the location information transmitting unit 14 inside the electronic device 101 reads the device identification code, "C103," indicating the "report target," along with the medium identification code, "C201," from the information recording medium 201 in communication, and transmits the self location information of "Tokyo Headquarters," stored in the location information storage unit 12, and the read medium identification code, "C201," via the network N to the electronic device 103 that is set as the "report target." As a result, the information that the location of the "Employee A," corresponding to the medium identification code, "C201," is the "Tokyo Headquarters" is transmitted to the electronic device 103. By carrying out such operation, an above-described case where a plurality of employees, such as employees A, B, and C, set the same electronic device as the "report target" can be accommodated as well.

Moreover, as was described in Section 1, if there are no cases where a plurality of employees set the same electronic device as the "report target," the medium identification code storage unit 24 does not necessarily have to be provided inside the information recording medium 201. In this case, it suffices for the location information transmitting unit 14 to have the function of transmitting just the location information.

Meanwhile, a location information presenting unit 13 is a component that serves a function of storing location information, transmitted to itself via the network N, and presenting this information according to a predetermined method. If the location information transmitting unit 14 has the function of transmitting the medium identification code along with the location information, the medium identification code or the corresponding user name may be presented along with the location information. This function is that of performing the process corresponding to the third step in Section 1.

For example, if just the location information, "Tokyo Headquarters," is transmitted (that is, if there are no cases where a plurality of employees set the same electronic device as the "report target" as mentioned above), because the electronic device is used as a dedicated device for presenting the location of a specific employee, it suffices to present just a message, such as "Presently at the Tokyo Headquarters." On the other hand, if the medium identification code, "C201," is transmitted along with the location information, "Tokyo Headquarters," a presentation, such as "C201 is at the Tokyo Headquarters," may be made or a correspondence list may be referenced and, upon recognizing that the medium identification code "C201" corresponds to the "Employee A," a presentation, such as "Employee A is at the Tokyo Headquarters," may be made. Obviously if a character string that indicates a name, such as "Employee A," is used as the medium identification code, a presentation, such as "Employee A is at the Tokyo Headquarters," can be made without referencing a correspondence list, etc.

Lastly, a report target writing unit 15 is a component that serves a function of writing the self device identification code, stored in the device identification code storage unit 11, in the report target device registration unit 23 of the information recording medium 201 in communication. This function is that of performing the process corresponding to the first step described in Section 1. For example, when the employee A, in the state of being logged into the electronic device 103, which is the employee A's own personal computer, using the information recording medium 201, which is the employee A's own employee ID card, provides a write instruction to the report target writing unit 15, the device identification code, "C103," stored in the device identification code storage unit 11, is written into the report target device registration unit 23 at the information recording medium 201 side. FIG. 2 shows a state where such a writing process is completed.

Obviously, the employee A can change the registered contents of the report target device registration unit 23 at any time. For example, if a short-term transfer order to work at the Yokohama Branch for just one month has been issued, the employee A, in the state of being logged into the electronic device 102, installed at the Yokohama Branch, by using the information recording medium 201, which is the employee ID, provides the write instruction to the report target writing unit 15 in the electronic device 102. The device identification code, "C102," stored in the device identification code storage unit 11 inside the electronic device 102 is thereby written into the report target device registration unit 23 at the information recording medium 201 side. If arrangements are made so that overwriting is performed in this process, the device identification code, "C103," in the report target device registration unit 23 is rewritten to the new code "C102," and thereafter, the electronic device 102, installed at the Yokohama Branch, becomes the "report target" for the employee A. Obviously when the employee A returns to the Chiba Branch after one month, the device identification code, "C102," in the report target device registration unit 23 is returned to the original code of "C103" by providing the write instruction to the report target writing unit 15 in the state of being logged into the electronic device 103 again.

Also by providing the report target writing unit 15 with an additional writing function, a plurality of electronic devices can be registered as "report targets." For example, a case, where the employee A, who has returned to the Chiba Branch, is now involved in a business such that he/she goes back and forth between the Saitama Plant and the Chiba Branch, shall be considered. In this case, the employee A, in the state of being logged into the electronic device 104, installed at the Saitama Plant, by using the information recording medium 201 that is the employee ID card, provides the write instruction for additional writing to the report target writing unit 15 in the electronic device 104.

The device identification code "C104," stored in the device identification code storage unit 11 inside the electronic device 104 is thereby written additionally in the report target device registration unit 23 at the information recording medium 201 side, and a state in which both the electronic device 103 and the electronic device 104 are registered as "report targets" is entered. Because the location of the employee A is thereafter presented at both the electronic device 103 and the electronic device 104, "At the Chiba Branch" is presented on the electronic device 104 at the Saitama Plant when the employee A is at the Chiba Branch, and "At the Saitama Plant" is presented on the electronic device 103 at the Chiba Branch when the employee A is at the Saitama Plant. Obviously when the employee A goes to the Tokyo Headquarters on business, "At the Tokyo Headquarters" is presented at both of the electronic devices 103 and 104.

That is, when, in a case where arrangements are made so that the device identification codes concerning a plurality of electronic devices can be written into the report target device registration unit 23 inside an information recording medium, a plurality of device identification codes are written in the report target device registration unit 23 of the information recording medium in communication, the location information transmitting unit 13 is arranged to perform transmission of information to each electronic device specified by each individual device identification code.

Also the report target writing unit 15 may be provided with a function of writing not just its own device identification code (that is, the device identification code stored in the device identification code storage unit 11) but of writing an arbitrary device identification code, designated by a user, as well. The employee A at the Chiba Branch can then perform, for example, a process of adding an arbitrary electronic device as a "report target" just by operating the electronic device 103 installed at the Chiba Branch.

In cases where the report target writing unit 15 is provided with such an additional writing function, a deletion function is also preferably provided. Specifically, a list of the device identification codes currently registered in the report target device registration unit 23 of an information recording medium in communication currently is made to be displayed and arrangements are made to perform a process, by which a specific device identification code, designated from among the listed codes by a user, is deleted. By thus enabling "report targets" to be added and deleted at any time, a user can perform the "report target" setting freely as necessary.

Section 3. Essential Components to the Electronic Devices

The basic arrangements of the electronic devices and the information recording media used in the present invention were described in reference to FIG. 2 in Section 2 above. There it was described that the medium identification code storage unit 24 in the information recording medium 201 is not an essential component, and if there are no cases where a plurality of employees set the same electronic device as the common "report target," the medium identification code storage unit 24 does not necessarily have to be provided in the information recording medium 201, and in this case, it suffices for the location information transmitting unit 14 to have the function of transmitting just the location information.

Meanwhile, in regard to the electronic devices, not all of the components included in the electronic device 103 of FIG. 2 need to be included in all of the electronic devices used in the system according to the present invention. Thus in this Section 3, a supplementary description shall be provided concerning the essential components of the electronic devices used in the present invention.

With the present invention, although a plurality of electronic devices that are mutually connected by a network are essential, in consideration of the principles of operation of the present invention, it can be understood that, with the electronic devices as referred to in the present invention, there are two types of roles. These two types of roles are a role of a transmitter of location information and a role of a receiver of location information. For example, with the description made thus far with reference to FIG. 1, an example was described where, when the employee A, who has registered the electronic device 103, installed at the Chiba Branch, as the "report target," goes to the Tokyo Headquarters on business and performs the task of logging into the electronic device 101, the location information of "Tokyo Headquarters" is transmitted from the electronic device 101 to the electronic device 103 via the network N, and "Presently at the Tokyo Headquarters" is presented on the display screen of the electronic device 103 at the Chiba Branch. In this case, the electronic device 101 serves the role of a transmitter of location information, and the electronic device 103 serves the role of a receiver of location information.

The electronic device 103, shown in the upper stage of FIG. 2, thus has an arrangement enabling both the role of a transmitter of location information and the role of a receiver of location information to be served. If an arrangement equivalent to that of the electronic device 103, shown in the upper stage of FIG. 2, is to be employed in all of the electronic devices 101 to 104, shown in FIG. 1, each of the electronic devices 101 to 104 is enabled to serve both the role of a transmitter of location information and the role of a receiver of location information.

However, in putting the present invention into practice, not all of the electronic devices connected to the network N need to serve both of the above roles. The present invention can be put into practice even upon employment of an arrangement where specific electronic devices serve only the role of a transmitter of information and other specific electronic devices serve only the role of a receiver of information. It shall now be examined which of the respective components of the electronic device 103, shown in the upper stage of FIG. 2, contribute to which of the roles.

First, because the device identification code storage unit 11 is the component that stores the device identification code provided to each electronic device itself to enable the respective electronic devices on the network N to identify each other, it is an essential component for an electronic device that is used by being connected to the network N. The device identification code storage unit 11 is thus a component that is required by both transmitters and receivers of information.

Meanwhile, because the location information storage unit 12 and the location information transmitting unit 14 are components necessary for transmitting location information, these are components that are required only by transmitters of information. On the other hand, because the location information presenting unit 13 is a component that is necessary for presenting received location information, it is a component that is required only by receivers of information.

How about the authentication unit 16 and the communicating unit 17? First, these components are unnecessary for receivers of information. Because the functions of a receiver of information are to receive location information transmitted to the receiver itself and to display the received information, communication with and authentication of an information recording medium are not necessary. Meanwhile, the authentication unit 16 and the communicating unit 17 are necessary for the functions of a transmitter of information to be served. For example, to transmit the information, "Employee A is at the Tokyo Headquarters," communication with the information recording medium 201, owned as the employee ID card by the employee A, by means of the communicating unit 17 and authentication of the medium as a legitimate medium are necessary. The authentication unit 16 and the communicating unit 17 are thus components required only by transmitters of information.

Figure 3:
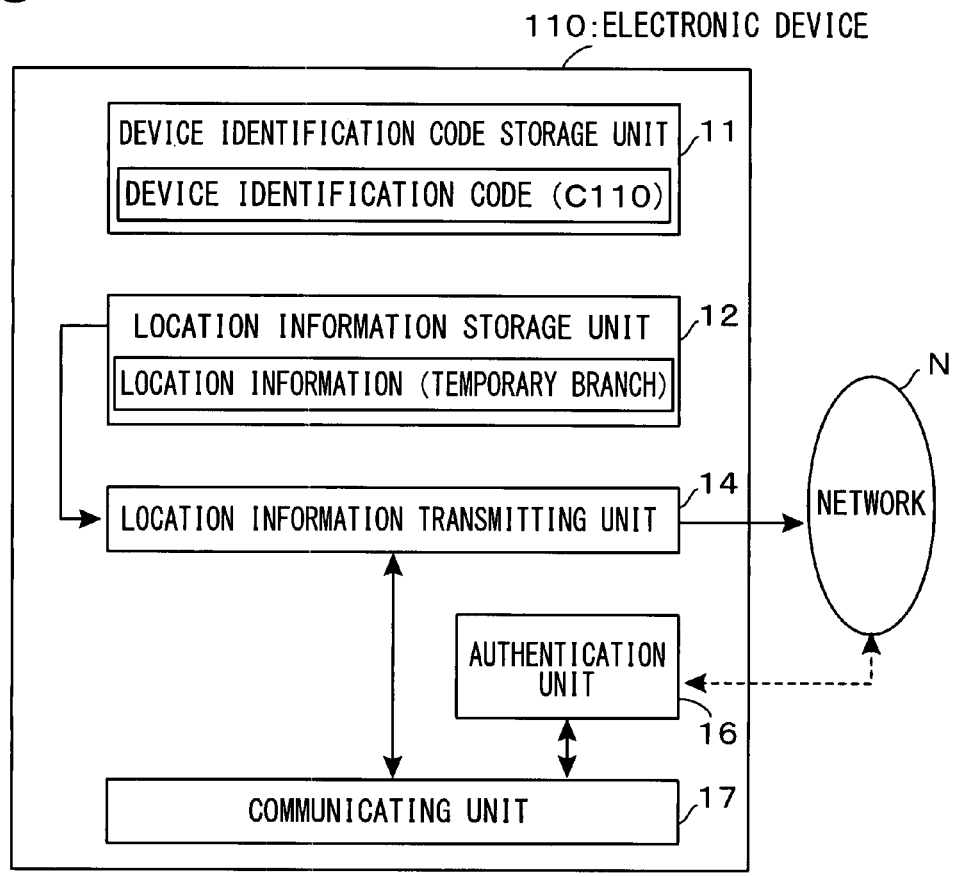
FIG. 3 is a block diagram of an arrangement of an electronic device having only functions of a transmitter of location information.

Thus in putting the present invention into practice, it suffices, as shown by an electronic device 110 in FIG. 3, for an electronic device that is to function as a transmitter of information to have just the device identification code storage unit 11 (a case where the device identification code of "C110" is stored is illustrated in the present example), the location information storage unit 12 (a case where the location information of "Temporary branch" is stored is illustrated in the present example), the location information transmitting unit 14, the authentication unit 16, and the communicating unit 17. Likewise in putting the present invention into practice, it suffices, as shown by an electronic device 120 in FIG. 4, for an electronic device that is to function as a receiver of information to have just the device identification code storage unit 11 (a case where the device identification code of "C120" is stored is illustrated in the present example) and the location information presenting unit 13.

The electronic device 110 shown in FIG. 3 is a personal computer, which is installed at a normally unmanned temporary branch and, when an employee goes to this temporary branch on business, must transmit the location information of "Temporary branch" to another electronic device that is registered as the "report target" for the employee. However there is no need whatsoever to display the location of someone on the screen of this personal computer. In such a case, although the electronic device 110 is required to serve the role of a transmitter of location information, it is not required to serve the role of a receiver of location information. As illustrated, the electronic device 110 is thus constituted only of components that are essential for a transmitter of location information.

Figure 4:
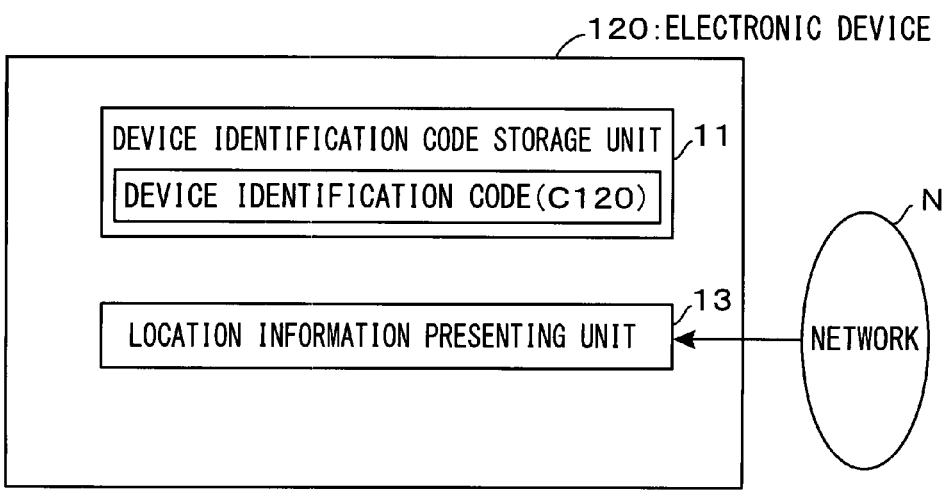
FIG. 4 is a block diagram of an arrangement of an electronic device having only functions of a receiver of location information.

Meanwhile, the electronic device 120 shown in FIG. 4 is an electronic bulletin board and has only a function of displaying the locations of specific users (employees). Because the electronic device 120 is not provided with other functions, it does not perform any tasks, with which a user uses an employee ID card to perform login. As illustrated, the electronic device 120 is thus constituted only from components that are essential for a receiver of location information.

An electronic device, such as the electronic device 110 shown in FIG. 3, which does not have the functions of a receiver of location information, is an "undesignatable electronic device" that cannot be designated as a "report target." Meanwhile, the electronic device 103 shown in the upper stage of FIG. 2 and the electronic device 120 shown in FIG. 4 are "designatable electronic devices" that can be designated as "report targets."

From the above standpoint, in putting the present invention into practice, at least one electronic device having the functions of a transmitter of location information and at least one other electronic device having the functions of a receiver of location information must be present along the network N. Obviously, it is considered that, for practical use, a plurality of electronic devices, each of which can serve the role of a transmitter of location information and the role of a receiver of location information as in the case of the electronic device 103 shown in the upper stage of FIG. 2, will be used in general cases. However, not all of the electronic devices need to be provided with an arrangement for serving the roles of both a transmitter and a receiver, and it suffices that at least some of the electronic devices be enabled to serve the role of a transmitter and at least some of the electronic devices be enabled to serve the role of a receiver.

Lastly, the necessity of the report target writing unit 15 shall be described. This report target writing unit 15 is actually not a component that is essential in either the transmitter or the receiver of information. Although the report target writing unit 15 performs the process of writing the device identification code of a specific electronic device that is to be a "report target" into the report target device registration unit 23 inside an information recording medium 201 in communication, this writing process may be performed using any device. Put in another way, the registration into the report target device registration unit 23 does not necessarily have to be performed from any of the electronic devices connected to the network N and can be executed using any device that is a device that can perform the process of writing into the information recording medium 201.

However for practical use, the report target writing unit 15 is preferably provided in at least some of the electronic devices. In particular, because the report target writing unit 15 that is incorporated in the electronic device 103 that is shown in the upper stage of FIG. 2 has a function of writing the device identification code, "C103," of the electronic device 103 itself, which is stored in the device identification code storage unit 11, into the report target device registration unit 23 in the information recording medium 201 in communication, a user can make the process, of registering the electronic device that he/she is currently logged in as the "report target," be executed without performing a task of designating the electronic device to be registered as the "report target" or inputting some form of device identification code.

More preferably, the report target writing unit 15 is provided with a function such that when a request for self-designating a report target device is made by a user, a process of writing the self device identification code, stored in the device identification code storage unit 11, into the report target device registration unit 23 in the information recording medium 201 in communication is executed, and when a request for designating a non-self electronic device is made by user, a process of writing the device identification code of the designated electronic device into the report target device registration unit 23 in the information recording medium 201 in communication is executed.

Specifically, at the point at which the report target writing unit 15 is started up, a message, such as "Which electronic device shall be registered as a report target? (1) This device (2) Another device," is made to be displayed, and when a user selects (1), it is judged that a request for self-designating a report target device has been made by the user and the process of writing the self device identification code, stored in the device identification storage unit 11, is executed. On the other hand, if the user selects (2), a list of electronic devices is presented anew, and when the user selects a specific electronic device from the list, the process of writing the device identification code of the selected electronic device is executed.

Section 4. Variations of the Electronic Device

Although the embodiments described thus far were examples in which the electronic devices connected to the network N are personal computers, the electronic device as referred to in the present invention does not necessarily have to be a personal computer or a similar device. In putting the present invention into practice, printers, copiers and other office furniture and equipment (such as so-called multifunction devices that have a plurality of functions, such as those of a printer, facsimile, copier, etc., office equipment, such as electronic lockers, cabinets, etc.), electronic locks, electronic bulletin boards, etc., can be used besides computers as the electronic devices. Embodiments in which various electronic devices are used shall now be described.

Figure 5:
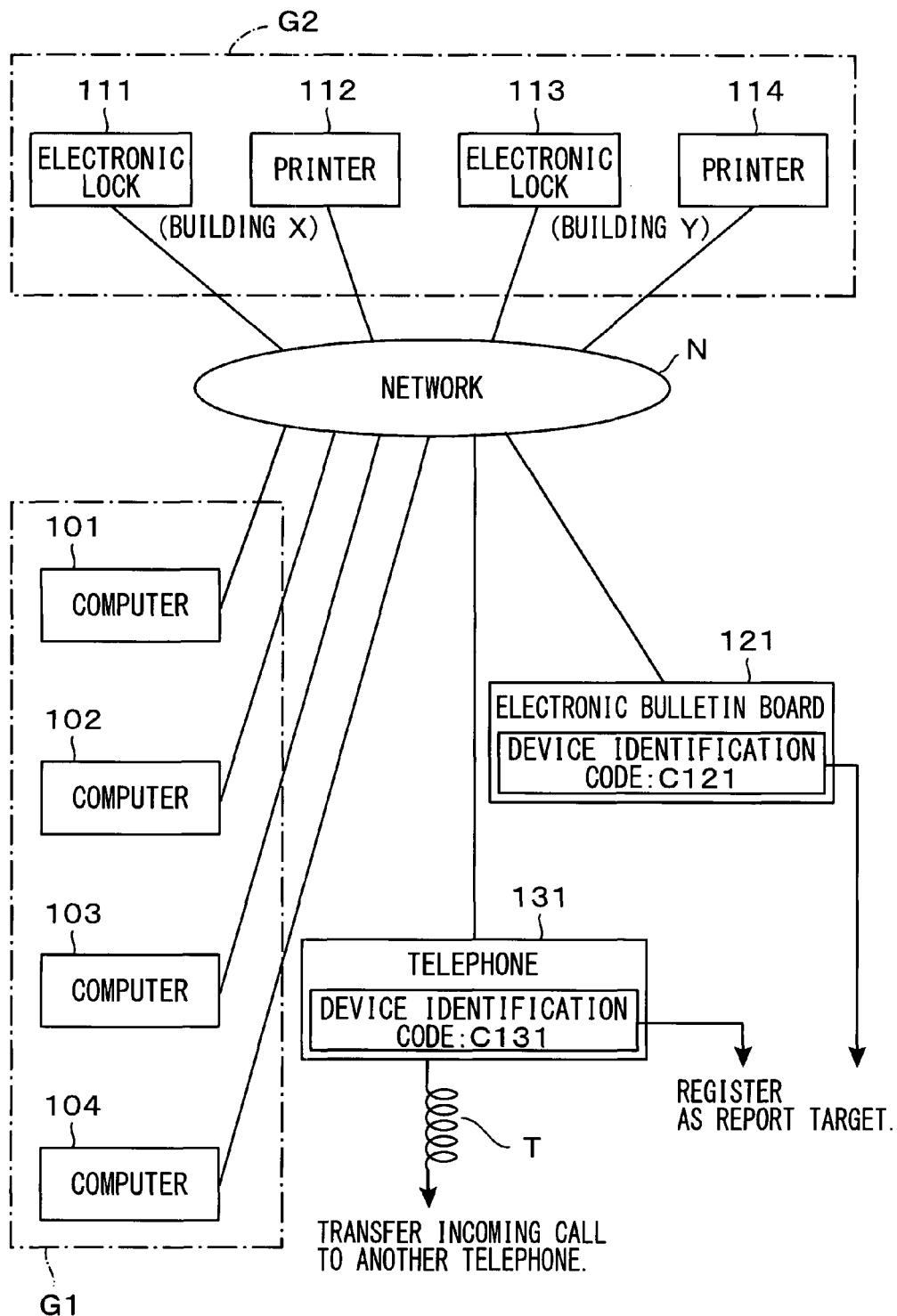
FIG. 5 is a block diagram of a system according to another embodiment of the present invention.

FIG. 5 is a block diagram of a system according to another embodiment of the present invention. In this embodiment, various electronic devices are connected to the network N. The illustrated computers 101 to 104 are electronic devices equivalent to the electronic devices 101 to 104 shown in FIG. 1, and each has the same arrangement as the electronic device 103 shown in the upper stage of FIG. 2. That is, the computers 101 to 104 that are grouped in a group G1 are electronic devices that can serve the roles of both a transmitter and a receiver of location information and are designatable as report targets.

Meanwhile, all of electronic locks 111 and 113 and printers 112 and 114 that are grouped in a group G2 can serve the role of a transmitter of location information but cannot serve the role of a receiver of location information. That is, the electronic devices belonging to the group G2 are electronic devices equivalent to the electronic device 110 shown in FIG. 3 and are electronic devices that are undesignatable as report targets.

To be more specific, the electronic lock 111 is an electronic lock that is attached to an entrance gate of a building X, and specific employees can use information recording media (IC cards), distributed as employee ID cards, as electronic keys to perform an operation of unlocking the electronic lock 111. Because all examples described thus far were examples concerning electronic devices constituted of personal computers, the authentication process using the information recording medium distributed as an employee ID card was positioned as a process necessary for performing a login procedure on a personal computer. Meanwhile, an authentication process performed inside the electronic lock 111 is a process of judging whether or not a correct key code is stored in an information recording medium.

For example, if the employee A is an employee who is allowed to enter the building X, the information recording medium 201 that functions as the employee ID card of the employee A serves the function of an electronic key with respect to the electronic device that is the electronic lock 111. The authentication information stored in the electronic key has significance as a key code of an electronic key, and if this is confirmed to be the correct key code by the electronic lock 111, the unlocking operation is enabled. The employee A inserts the information recording medium 201, which functions as an employee ID card, into the electronic lock 111 (in the case where the information recording medium 201 is a contactless type IC card, brings the information recording medium 201 close to the electronic lock 111), and when an unlock button of the electronic lock 111 is pressed, the entrance gate of the building X opens. The electronic lock 113 is likewise an electronic lock attached to an entrance gate of a building Y.

Whereas the electronic devices 101 to 104 are computers, the electronic devices 111 and 113 are electronic locks, and these differ completely in terms of primary functions as electronic devices. However, from the standpoint of an electronic device that is a component in the present invention, the computers and the locks share the point of being electronic devices that respectively serve the role of a transmitter of location information. For example, when the employee A uses the information recording medium 201 that functions as an employee ID card to unlock the electronic lock 111, the electronic lock 111 can transmit the location information of "building X" to the computer 103 that is registered as the "report target." Consequently, the display screen of the computer 103 can be made to display, for example, "Presently in the building X." Likewise, when the electronic lock 113, provided on the entrance gate of the building Y is unlocked, the display screen can be made to display, for example, "Presently in the building Y." Also, by providing a similar electronic lock on an exit gate of the building X, when the employee A passes through the exit gate, the display screen can be made to display, for example, "Left the building X just now."

Meanwhile, the printers 112 and 114 are so-called network connected printers and are printers of a type requiring authentication, using an information recording medium that functions as an employee ID card, for use. As an example, a case shall be considered where the employee A, who has entered the building X, enters a specific room (for example, room No. 112), in which the printer 112 is installed, to perform a print task. In this case, a task equivalent to a login task performed on a personal computer must be performed to use the printer 112. That is, the employee A inserts the information recording medium 201 in a reader/writer for the printer 112 (or, in the case where the information recording medium 201 is a contactless type IC card, brings the information recording medium 201 close to the printer 112) and performs an authentication process in accordance with a predetermined procedure.

When the employee A thus completes the authentication process with respect to the printer 112, the printer 112, which functions as an electronic device that serves the role of a transmitter of location information, can transmit the location information of "room No. 112 of building X" to the computer 103, which is registered as the "report target" Consequently, the display screen of the computer 103 can be made to display a message, such as "Presently in room No. 112 of building X." Likewise, when the printer 114 installed in a room No. 114 of the building Y is used, a display, such as "Presently in room No. 114 of building Y," can be performed.

Although electronic locks and printers were given as examples of the electronic devices belonging to the group G2 above, various other devices can be used as the electronic device as referred to in the present invention. Two other electronic devices are shown as examples in FIG. 5. These are an electronic bulletin board 121 and a telephone 131.

The electronic bulletin board 121 is a device equivalent to that described as the electronic device 120 in FIG. 4 and can serve only the role of a receiver of location information. This electronic bulletin board 121 is thus provided with a predetermined device identification code (the code, "C121," in the illustrated example). Also, the electronic bulletin board 121 has a function of receiving location information transmitted to itself via the network N and presenting this location information, and is an electronic device that is designatable as a report target.

To register this electronic bulletin board 121 as a "report target," a process, of writing the device identification code, "C121," of the electronic bulletin board 121 itself into the report target device registration unit 23 of an information recording medium, is performed as illustrated. Obviously in a case where a plurality of employees set the electronic bulletin board 121 as a common "report target," by transmitting both the location information and a medium identification code (a code by which the employee who owns the medium can be specified), "who is where" can be displayed in the form of a list on the electronic bulletin board 121.

Meanwhile, the telephone 131 is an electronic device that has unique functions that differ slightly from those of a normal telephone. That is, this telephone 131 is provided with a predetermined device identification code (the code, "C131," in the illustrated example). Moreover, the telephone 131 can receive location information transmitted via the network N, and has a function of transferring an incoming call (a call received via a telephone line T) to another telephone installed at a location specified by the received location information.

Obviously, the telephone 131 is an electronic device that is designatable as a report target, and to register this telephone 131 as a "report target," a process, of writing the device identification code, "C131," of the telephone 131 itself into the report target device registration unit 23 of an information recording medium, is performed as illustrated.

For example, it shall be deemed that this telephone 131 is a telephone installed on the desk of the employee A at the Chiba Branch, and normally the employee A uses this telephone 131. One day, the employee A goes to the Tokyo Headquarters on business. In this case, if the employee A has registered the telephone 131 as a "report target" in advance, a telephone call for the employee A that is made to the telephone 131 while the employee A is away can be made to be transferred and received at a telephone in the Tokyo Headquarters, which is the destination of the employee A's business trip, by the following procedure.

First, the employee A, who has arrived at the Tokyo Headquarters for business, performs an authentication process (performs a login procedure) using the information recording medium 201 on the electronic device 101 that is installed in the Tokyo Headquarters (the personal computer used for work in the Tokyo Headquarters). The electronic device 101 thus transmits a predetermined location information to the electronic device (telephone) 131 that is set as the "report target." Here, it shall be deemed that more detailed location information, such as "the meeting room of the Sales Headquarters 7th Section on the 3rd floor of the headquarters building," is set as the location information indicating the installation location of the electronic device 101. Consequently, this detailed location information is transmitted to the telephone 131 via the network N.

Here, by preparing a predetermined telephone number list as digital data in the telephone 131 and providing the telephone 131 with a function of automatically searching, with respect to the location information of "the meeting room of the Sales Headquarters 7th Section on the 3rd floor of the headquarters building," a telephone number of another telephone installed in the meeting room, the telephone 131 is enabled to automatically recognize the telephone number of the headquarters meeting room that is the current location of the employee A. In such a state, when a call is made from the exterior to the telephone 131 via the telephone line T, the telephone 131 can be made to execute a process of automatically transferring this call to the telephone in the headquarters meeting room. The employee A is thereby enabled to receive a call for him/herself, which is made to the telephone 131 while the employee A is away, on the telephone in the Tokyo Headquarters, which is the destination of the business trip.

Although in FIG. 5, the telephone line T is illustrated as a separate line from the network N, in a case where the telephone 131 is an internet phone, etc., the telephone line T is obviously also a line accessed via the network N.

Section 5. Modification Examples of the Present Invention

Some modification examples of the present invention shall now be described.

(1) Use in Common of the Medium Identification Code and the Authentication Information Although with the information recording medium 201 shown in FIG. 2, an example where the authentication information storage unit 22 and the medium identification code storage unit 24 are disposed separately and the authentication information and the medium identification code are handled as separate information is illustrated, the authentication information, stored in the authentication information storage unit 22, or a portion of the authentication information may be used as the medium identification code, and in this case, the medium identification code storage unit 24 is made unnecessary.

(2) Variations of the Location Information

Although in the example shown in FIG. 1, character strings indicating general locations, such as "Tokyo Headquarters," "Saitama Plant," etc., are used as location information that indicate the locations at which the individual electronic devices are installed, for practical use, more detailed location information are preferably used. For example, by using detailed location information, such as "the meeting room of the Sales Headquarters 7th Section on the 3rd floor of the headquarters building," "the No. 4 clean room on the 5th floor of building No. 4 of the Saitama Plant," etc., the location of an employee can be ascertained in room units. Obviously, in cases where a printer or other electronic device is used, the location of an employee can be ascertained in desk or table units on which the printers are installed, such as "the No. 6 table in the No. 4 clean room on the 5th floor of building No. 4 of the Saitama Plant."

As the location information, information constituted of a character string does not have to be used necessarily and, for example, in place of the character string of "Tokyo Headquarters," a device identification code, such as "C101," may be used as the location information. In this case, a correspondence table of device identification codes, concerning specific electronic devices, and character strings, indicating the installation locations of the electronic devices, is prepared, and an electronic device that serves the role of a receiver is made to reference this correspondence table to convert a device identification code, such as "C101," which is transmitted as the location information, to a character string, such as "Tokyo Headquarters," and present the character string. In the present application, "location information" does not signify just information that directly indicates a location but also includes information, by which a location can be indicated indirectly by referencing of some form of corresponding relationship. For example, an electronic device can use its own device identification code as location information, and in this case, the same storage unit can be used in common as the identification code storage unit 11 and the location information storage unit 12.

(3) Use of IP Protocol and E-Mail

Networks using an IP protocol have come to be used popularly recently, and when a network using the IP protocol is used as the network N, an IP address is preferably used as the device identification code.

Also, in a case where the location information transmitting unit 14 transmits location information to a specific electronic device registered as a "report target," the information transmission can be performed by e-mail.

(4) Location Information Transmitted a Plurality of Times

With the example shown in FIG. 1, when, for example, the employee A, who is a staff of the Chiba Branch, moves in the order of: the Tokyo Headquarters; the Yokohama Branch; and the Saitama Plant; and uses the electronic devices 101, 102, and 104 at the respective locations, after the location information of "Tokyo Headquarters" is transmitted to the electronic device 103 that is set as the "report target," the location information of "Yokohama Branch" is transmitted and then the location information of "Saitama Plant" is transmitted. In such a case where an employee moves across several locations, location information are successively transmitted a plurality of times to the electronic device set as the "report target." In regard to location information that are transmitted a plurality of times in such a manner, the following two methods of treatment can be considered for the location information presenting unit 13.

First, in a first treatment method, only the newest location information transmitted via the network is presented. When this method is employed, in the case of the above-described example, the display on the display screen of the electronic device 103, set as the "report target" changes from "Presently at the Tokyo Headquarters" to "Presently at the Yokohama Branch" and furthermore to "Presently at the Saitama Plant." Although obviously such a location display is not necessarily accurate, and even when the employee A is riding on an elevator in the Yokohama Branch, the display of "Presently at the Tokyo Headquarters" is continued until the login procedure is performed on the electronic device 102, the location of the employee A, who is moving from place to place, can be ascertained to some degree.

In a case where a plurality of employees set the same electronic device as a "report target," the medium identification code is transmitted along with the location information, and in this case, just the newest location information for each individual medium identification code is presented. For example, if the newest location information concerning the employee A is "Yokohama Branch" and the newest location information concerning the employee B is "Saitama Plant," a presentation, such as "Employee A is at the Yokohama Branch. Employee B is at the Saitama Plant," is made.

In another treatment method, a plurality of the location information transmitted via the network are presented in a listed manner in an order that is in accordance with a time sequence. When this method is employed, in the case of the above example, first, "Presently at the Tokyo Headquarters" is displayed on the display screen of the electronic device 103 set as the "report target," and this display is then changed to "Presently at the Yokohama Branch after having gone to the Tokyo Headquarters," which is changed in the final stage to "Presently at the Saitama Plant after having gone to the Tokyo Headquarters and the Yokohama Branch." By performing such presentation, a movement path of the employee A can be ascertained.

In a case where a plurality of employees set the same electronic device as a "report target," the medium identification code is transmitted along with the location information, and in this case, a plurality of pieces of location information are presented in a listed manner in an order that is in accordance with a time sequence according to each individual medium identification code. Specifically, a presentation, such as "Employee A is at the Yokohama Branch after having gone to the Tokyo Headquarters. Employee B is at the Tokyo Headquarters after having gone to the Saitama Plant," is made.

(5) Ways of Presentation by the Location Information Presenting Unit

The location information presenting unit 13 is a component having a function of storing location information transmitted to itself via the network N and presenting the location information according to a predetermined method, and the way of presentation of the location information may basically be any way.

In a case where an electronic device for performing just the presentation of location information, such as the electronic bulletin board 121 described above, is registered as a "report target," such an electronic device may be made to present the location information constantly because the presentation of the location information is the exclusive task assigned to the electronic device. However, in cases where a normal personal computer is registered as a "report target," there are cases where it may not be preferable to present the location information constantly.

Thus for practical use, in a case where an electronic device, such as a personal computer is registered as a "report target,"

arrangements are preferably made so that the location information presenting unit of the electronic device performs presentation of the location information on the display screen of the electronic device only when a user provides a location information presenting instruction.

Or, a general personal computer has a function of automatically entering a rest mode (a mode of switching from a normal screen display to a special screen display set in advance) when an operation input is not performed for a fixed time. Depending on settings, the display screen can be made to become dark or a so-called screen saver program can be started up automatically when such a rest mode is entered. Such a function of a personal computer can be used so that when a rest mode is entered, the location information presenting unit inside the personal computer automatically presents location information on the display screen of the personal computer. Such an application example is described in detail in Section 6.

Although with the embodiments thus far, examples in which the location information presenting unit 13 displays location information on a display screen were described, the presentation of location information does not necessarily have to be a visual presentation and presentation of location information by audio is also possible. For example, a message such as "Presently at the Tokyo Headquarters," may be issued in an audio form.

(6) Reset Operation

The location information presenting unit 13 performs a process of temporarily storing the location information that is transmitted to itself via the network and presenting this location information by a predetermined method, and for practical use, the location information presenting unit 13 is preferably enabled to undergo a reset operation, in which, based on an instruction of a user or the establishment of a predetermined condition, location information received in the past are deleted so as to disable subsequent presentation of these location information.

A case where the employee A, who went to the Tokyo Headquarters on business and has returned to his/her own desk in the Chiba Branch, shall be considered. In this case, the location information of "Tokyo Headquarters" is stored in the location information presenting unit 13 of the electronic device 103, which is the employee A's own personal computer, and the message, "Presently at the Tokyo Headquarters," is displayed on the display screen. However, because at this point, the employee A has already returned to his/her desk, the location information stored in the location information presenting unit 13 should be deleted so that the message, "Presently at the Tokyo Headquarters," is not displayed.

For this purpose, a reset operation function, by which, when a reset instruction is provided from a user, the location information received in the past are deleted and subsequent presentation of these location information is prevented, is prepared in the location information presenting unit 13. Or, a condition, such as "perform the reset operation when the login procedure is performed," is set in advance, and the above-described reset operation is arranged to be executed automatically when this condition is established.

As a condition for performing the reset operation, a condition that concerns time, such as "perform the reset operation when 11 PM arrives," can also be set. By doing so, everyday when 11 PM arrives, the reset operation is performed all at once in all electronic devices and the system can constantly be started from an initial state at the start of business the next day. Or for electronic devices at the Chiba Branch, a condition, such as "perform the reset operation when the front gate of the Chiba Branch becomes locked," may be set. In this case, when all of the staff of the Chiba Branch goes home and a guard locks the front gate, all of the electronic devices in the Chiba Branch are reset all at once.

Not just the location information presenting unit 13 may be subject to the reset operation. For example, arrangements may be made to reset the registered contents in the report target device registration unit 23 in the information recording medium 201. In this case, a specific electronic device is provided with a function of deleting, based on an instruction of a user or the establishment of a predetermined condition, a predetermined device identification code recorded in the report target device registration unit 23 of an information recording medium 201.

For example, by setting a condition, such as "reset registration as a report target when 5 PM arrives on Friday, each week," the device identification code recorded inside the report target device registration unit 23 inside an information recording medium 201 that is communicable with a specific electronic device becomes deleted at 5 PM on Friday, each week. Obviously, a setting can be made by which only a specific device identification code is selectively deleted. For example, by setting so that among the device identification codes recorded inside the report target device registration unit 23, just the top device identification code is left and all of the other codes are deleted, the registrations, with the exception of the registration concerning the "top report target," are automatically deleted every weekend.

(7) Other Modification Examples

Although a basic embodiment and various modification examples according to the present invention have been described above, the present invention is not restricted to the embodiments and modification examples described thus far and can be put into practice in various modes besides these. That is, the basic concepts of the present invention are to: configure a system from a plurality of fixed devices, which are installed at mutually different locations, and a portable mobile device, having a function of communicating with any of the fixed devices by being brought within a communicable area of the fixed device; have information indicating a specific fixed device (fixed device to be a report target) be recorded in the mobile device; and when any of the fixed devices communicates with the mobile device, have a process be performed by which location information, indicating a location of the fixed device itself, is transmitted to the specific fixed device recorded in the mobile device; and as long as these basic concepts are not deviated from, the present invention can be put into practice in various modes.

Section 6. Example of Application to a Screen Lock Absence Display System

Lastly, an application example, in which the system according to the present invention is used as a "screen lock absence display system" shall be described. Here, a "screen lock absence display system" is a system by which, when an employee, who is involved in work using a personal computer in a company, etc., leaves his/her desk for some business and leaves the room in which the personal computer is installed, location information of the employee is displayed on a display of the personal computer that is in a screen-locked state and thereby notified to other employees.

In a company, there are cases where an employee, who performs work using a personal computer, moves to another room for a meeting, conference, etc. There are known arts of providing the personal computer with a screen lock function to prevent unauthorized use of the personal computer by a third party at such times of absence from one's desk (see, for example, Japanese Patent Laid-open Publication No. 2003-167641A and No. 2005-149443A). A screen lock function prevents acceptance of operation inputs for primary processes until a lock releasing process is performed by a user. Because a screen-locked personal computer is put in a state in which it cannot be used normally until the proper user him/herself releases the lock, security is maintained when the user is absent. That is, a screen locked personal computer is put in a state, in which the lock is not released and use is prevented unless the proper user inputs a password or the identity of the proper user is verified by biometric authentication, etc. Normally in many cases, a setting is made so that when an input operation is not performed on the personal computer for a preset time, the screen lock is applied automatically. Thus when a proper user forgets to turn off the power of the personal computer and becomes absent for a long time to attend a conference, etc., the personal computer is left in state of being screen-locked automatically.

Also in a general company, etc., when one's destination is known in advance, an employee is recommended to leave after entering destination information in a destination entry board, etc. By doing so, when a telephone call to the employee is received, a colleague can accommodate by notifying the destination, entered in the destination entry board, to the caller or by contacting the employee him/herself directly. However, in cases where the room in which a meeting or conference is taking place is changed or a plurality of meetings or conferences are attended successively, it may become impossible to specify where the employee is at the present point in time. A problem that the employee cannot be contacted in a short time when he/she needs to be contacted for an emergency thus occurs.

Thus in the application example of the present invention described here, destination display of a user of a personal computer with a screen lock function is made to be performed on a display of the personal computer. By introducing a system according to this application example, when the user of the personal computer with the screen lock function leaves the room in which the personal computer is installed, destination information of the user is made to be displayed on the display of the screen locked personal computer and the destination information can thus be transmitted to others. The user can thus be contacted readily even in cases where he/she needs to be contacted for an emergency.

FIG. 6 is a schematic, transparent perspective view of an embodiment, in which the present invention is applied to a screen lock absence display system. Here, for the sake of description, a simple model is shown where two rooms A and B, the entry and exit into and out of which are managed, are located separately on an upper floor and a lower floor. An information processing device 1, indicated by broken lines in the figure, is constituted of a dedicated computer for overall management of the absence display system and is installed at an arbitrary location of the present building. A communication network 2 for the information processing device 1 is wired at necessary locations inside each of the rooms A and B. Here, it shall be deemed that the room A on the upper floor is a working room, in which a specific employee 3 usually performs work, and the room B on the lower floor is a conference room in common for employees.

It shall also be deemed that a contactless IC card (portable information recording medium) is distributed as an employee ID card to each individual employee, and that the specific employee 3 constantly holds a contactless IC card 4 as the employee ID card. An employee ID and other identification information of the employee 3 are registered in advance in a memory of the contactless IC card 4 when the card is issued.

Entry and exit into and out of the rooms A and B are managed by use of the IC card 4. The rooms A and B are thus provided with IC card readers 5A and 5B, which are entry reading devices that read the identification information stored in the IC card 4 (and are mounted so as to face the outer sides of the rooms), and IC card readers 6A and 6B, which are exit reading devices (that are mounted so as to face the inner sides of the rooms). These IC card readers are respectively installed near an entrance/exit of each room and are each a reading device that reads the identification information recorded in the contactless IC card when entry or exit into or from the corresponding room is performed.

For the employee 3 to enter or exit through a door 7A or 7B of the room A or B, he/she must bring the contactless IC card 4 close to the corresponding IC card reader 5A, 5B, 6A, or 6B to perform authentication and unlock the door 7A or 7B. Door locking/unlocking devices 8A and 8B are devices provided to control lock states of the doors 7A and 7B, respectively, and control the lock states of the doors of the respective rooms based on the identification information read by the reading devices of the respective rooms A and B. Because the doors 7A and 7B are normally put in locked states by the door locking/unlocking devices 8A and 8B, a third party cannot enter or exit the rooms illegitimately.

A working desk (not shown) for the employee 3 is disposed in the room A, and a personal computer 9, used by the employee 3, is installed on this desk. The employee 3 usually sits at his/her own desk in the room A and performs work using his/her personal computer 9. Although only the personal computer 9 for the employee 3 is shown in the figure, because a plurality of employees perform work using respectively provided personal computers in the room A, the personal computers of the respective individual employees are also installed in actuality. Each personal computer has a function of performing a screen lock, by which operation inputs for primary processes are not accepted until a lock releasing process is performed by a user, and a function of displaying location information (to be described below) that is received from the exterior on a display in the screen-locked state.

As illustrated, the IC card readers 5A and 5B, which are the entry reading devices, the IC card readers 6A and 6B, which are the exit reading devices, and door locking/unlocking devices 8A and 8B are respectively connected by the communication network 2 to the information processing device 1. The personal computer 9, installed in the room A, and the unillustrated personal computers of other employees are also connected to the information processing device 1 by the communication network 2. The information processing device 1 has a function by which, based on identification information read by a reading device of a specific room, the personal computer corresponding to this identification information (personal computer to be the report target) is specified and the room information indicating the specific room is transmitted as location information to the personal computer.

When the employee 3 is to enter the room A or B, he/she must first make the identification information stored in the contactless IC card 4 be read by the IC card reader 5A or 5B. The identification information that has been read is transmitted to the information processing device 1 and authentication of whether or not the identification information is correct is preformed. In the information processing device 1, when the authentication result indicating the identification information to be correct is obtained, a door unlocking instruction signal is transmitted to the door locking/unlocking device 8A or 8B and unlocking of the door 7A or 7B is performed. Likewise when the employee 3 is to exit the room A or B, he/she must first make the identification information, stored in the contactless IC card 4, be read by the IC card reader 6A or 6B. The read identification information is transmitted to the information processing device 1 and authentication of whether or not the identification information is correct is preformed. In the information processing device 1, when the authentication result indicating the identification information to be correct is obtained, a door unlocking instruction signal is transmitted to the door locking/unlocking device 8A or 8B and unlocking of the door 7A or 7B is performed.

Obviously, employees, besides the employee 3, likewise perform entry into and exit from the respective rooms using their own dedicated, contactless IC cards in which are written the respective unique identification information. By performing such entry/exit management, the information processing device 1 can ascertain who enters and exits the respective rooms A and B and can furthermore transmit necessary information to the personal computers of the respective employees. That is, based on information received from the IC card readers 5A and 5B, which are the entry reading devices, and the IC card readers 6A and 6B, which are the exit reading devices, the information processing device 1 can perform authentication processes and transmit locking/unlocking instruction signals to the door locking/unlocking devices 8A and 8B and perform, for example, a process of transmitting, to the personal computer 9 installed in the room A, the location information during absence of the employee 3, who is the user of the personal computer 9.

Figure 7:
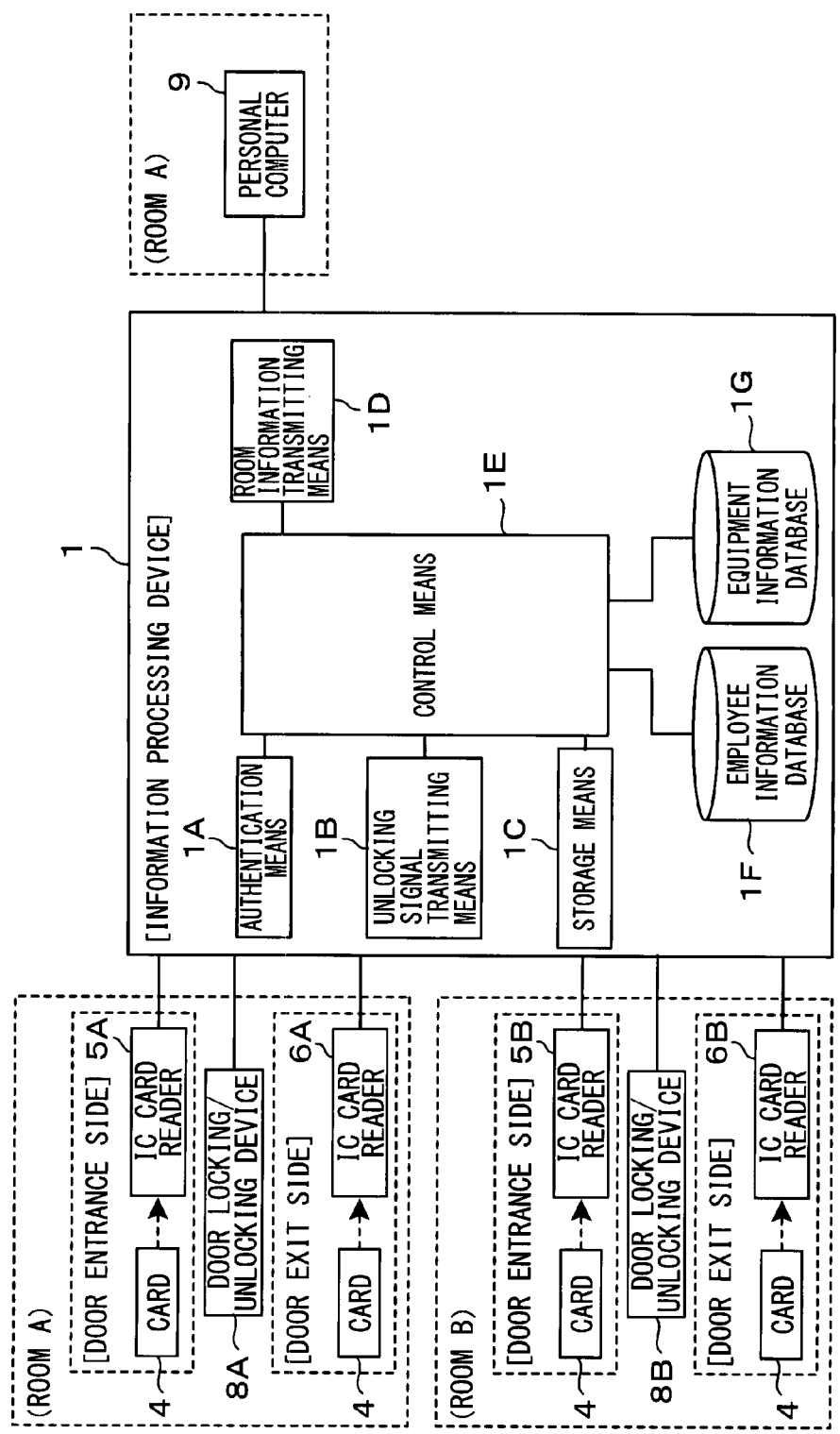
FIG. 7 is a block diagram of components involved in information processing in the screen lock absence display system shown in FIG. 6.

FIG. 7 is a block diagram of the components involved in the information processing in the screen lock absence display system shown in FIG. 6. As illustrated, the information processing device 1 includes an authentication means 1A, an unlocking signal transmitting means 1B, a storage means 1C, a room information transmitting means 1D, a control means 1E, an employee information database 1F, and an equipment information database 1G. The control means 1E performs overall control of the processes performed inside the information processing device 1, and the storage means 1C is used as a temporary data storage location in these processes.

In the employee information database 1F, the identification information (employee ID, etc.), stored in the contactless IC cards distributed to the respective individual employees, and personal information, such as the names of employees, and information indicating door unlocking authorities provided to the employees, are registered in a mutually associated manner. The authentication means 1A can thus reference the employee information database 1F based on the identification information read by a reading device of a specific room and confirm the provision or non-provision of the door unlocking authority for the room. If an employee indicated by the identification information has the door unlocking authority for the room, the judgment that authentication has succeeded can be made. When a correct authentication result is obtained by the authentication means 1A, the unlocking signal transmitting means 1B transmits an unlocking signal to the door locking/unlocking device of the corresponding room. Upon receiving the unlocking signal, the door locking/unlocking device 8A or 8B performs unlocking.

Meanwhile, in the equipment information database 1G, personal computer management numbers, which are information unique to the respective equipment, and identification information, such as employee IDs, of the users of the respective equipment are registered in a mutually associated manner so that the personal computers, which are equipment installed in the respective rooms, and the users thereof can be associated. As mentioned above, the employee ID and other identification information that specify an employee are recorded inside a contactless IC card, and because the equipment information database 1G serves a function of associating each employee ID with a specific personal computer (the personal computer used by the employee specified by the corresponding employee ID), the personal computer that is to be the transmission destination (report target) of the location information of an employee can be specified based on the corresponding employee ID or other identification information read from the contactless IC card.

At the left side of FIG. 7, the electronic devices disposed in the rooms A and B are indicated in the form of block diagrams. That is, the IC card reader 5A is installed at the door entrance side of the room A (outer side of the room) and the IC card reader 6A is installed at the door exit side (inner side of the room), and the states in which each performs wireless communication with the contactless IC card 4 are indicated in the form of a block diagram. Also, the door locking/unlocking device 8A that controls the locking and unlocking of the door 7A is installed in the room A. Likewise, the IC card reader 5B is installed at the door entrance side of the room B (outer side of the room) and the IC card reader 6B is installed at the door exit side (inner side of the room), and the states in which each performs wireless communication with the contactless IC card 4 are indicated in the form of a block diagram. Also, the door locking/unlocking device 8B that controls the locking and unlocking of the door 7B is installed in the room B.

Meanwhile, at the right side of FIG. 7, the personal computer 9, installed in the room A, is indicated in the form of a block diagram. Although besides this, personal computers for the respective individual employees are installed as mentioned above, illustration and description thereof shall be omitted here.

Figure 8:
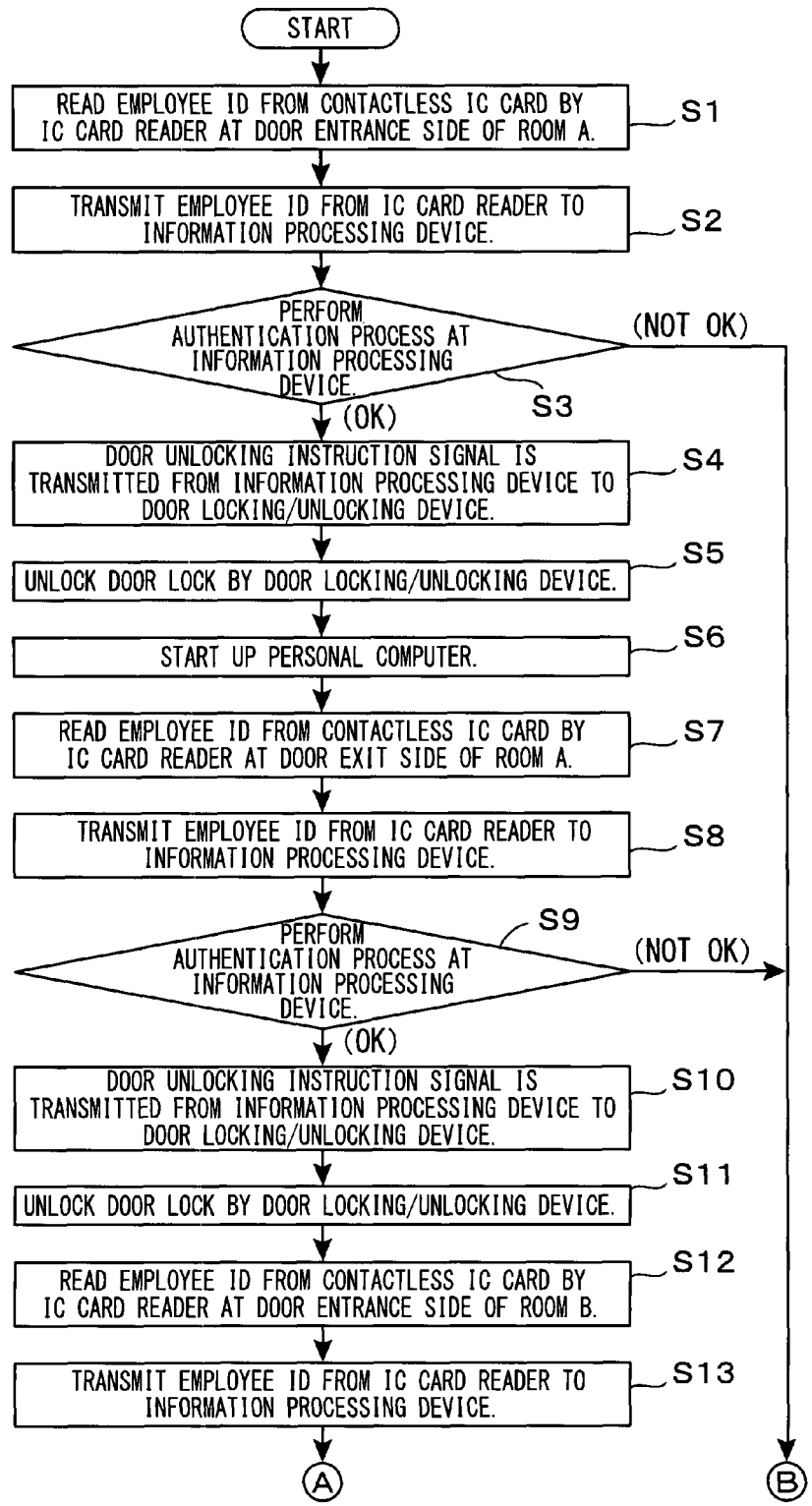
FIG. 8 is a flowchart of a first-half portion of a processing procedure of the screen lock absence display system shown in FIG. 6.
Figure 9:
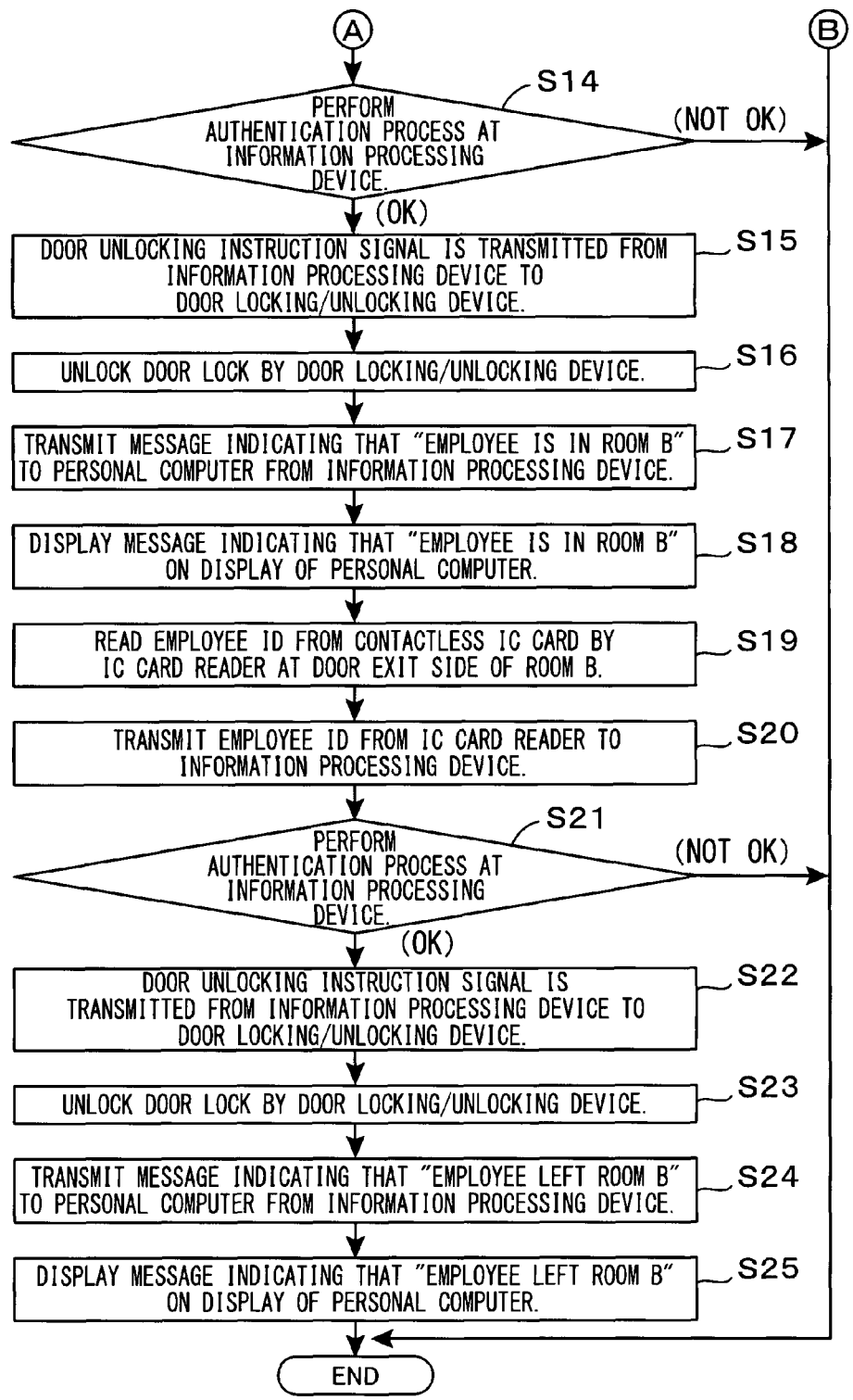
FIG. 9 is a flowchart of a latter-half portion of the processing procedure of the screen lock absence display system shown in FIG. 6.

A processing procedure of the screen lock absence display system shall now be described based on the flowcharts of FIG. 8 and FIG. 9. Here, in order to describe this processing procedure, the flow of processes, in a case where the specific employee 3 reports to work, enters the room A, in which his/her own desk, on which the personal computer 9 is installed, is placed, and, after working for awhile, leaves the room A and moves to the room B on the floor below, shall be described as an example.

First, the employee 3, who reports to work in the morning, brings the contactless IC card 4 close to the IC card reader 5A at the entrance side of the room A and makes the employee ID, stored in the contactless IC card 4, be read (step S1). The employee ID read by the IC card reader 5A is transmitted to the information processing device 1 (step S2). The information processing device 1 performs an authentication process, based on the information registered in the employee information database 1F, on the received employee ID (step S3). If correct authentication is performed in this authentication process, an instruction signal for unlocking the lock of the door is transmitted from the information processing device 1 to the door locking/unlocking device 8A (step S4). Upon receiving this instruction signal, the door locking/unlocking device 8A unlocks the lock of the door 7A (step S5). The employee 3 is thereby enabled to open the door 7A and enter the room A. Upon entering the room A, the employee 3 starts up the personal computer 9 and performs work using the personal computer 9 (step S6). On the other hand, if the authentication process fails in step S3, the process ends without the instruction signal for unlocking the lock of the door 7A being transmitted from the information processing device 1 to the door locking/unlocking device 8A.

Next, a case, where the employee 3, in the middle of performing work using the personal computer 9, moves from the room A to the room B to attend a meeting, shall be considered. In this case, the employee 3 brings the contactless IC card 4 close to the IC card reader 6A at the exit side of the room A and makes the employee ID, stored in the contactless IC card 4, be read (step S7). The employee ID read by the IC card reader 6A is transmitted to the information processing device 1 (step S8). The information processing device 1 performs an authentication process, based on the information registered in the employee information database 1F, on the received employee ID (step S9). If correct authentication is performed in this authentication process, the instruction signal for unlocking the lock of the door is transmitted from the information processing device 1 to the door locking/unlocking device 8A (step S10). Upon receiving this instruction signal, the door locking/unlocking device 8A unlocks the lock of the door 7A (step S11). The employee 3 is thereby enabled to open the door 7A and exit the room A. With the personal computer 9, the work on which is interrupted, a screen lock is started up automatically and a state, in which use by a third party is disabled, is entered after the elapse of a time set in advance.

The employee 3, who has exited the room A, comes to the front of the room B, in which a meeting is planned. The employee 3 then brings the contactless IC card 4 close to the IC card reader 5B at the entrance side of the room B and makes the employee ID stored in the contactless IC card 4 be read (step S12). The employee ID read by the IC card reader 5B is transmitted to the information processing device 1 (step S13). The information processing device 1 performs an authentication process, based on the information registered in the employee information database 1F, on the received employee ID (step S14). If correct authentication is performed in this authentication process, an instruction signal for unlocking the lock of the door is transmitted from the information processing device 1 to the door locking/unlocking device 8B (step S15). Upon receiving this instruction signal, the door locking/unlocking device 8B unlocks the lock of the door 7B (step S16). The employee 3 is thereby enabled to open the door 7B and enter the room B. On the other hand, if the authentication process fails in step S14, the process ends without the instruction signal for unlocking the lock of the door 7B being transmitted from the information processing device 1 to the door locking/unlocking device 8B.

When the authentication process in step S14 succeeds, the information processing device 1 can obtain the information that "the employee 3 has entered the room B." A process of notifying this entry information to the personal computer 9 of the employee 3 is thus performed. Specifically, the information processing device 1, on the basis of the employee ID received from the IC card reader 5B, recognizes the personal computer management number that is registered in association with the employee ID in the equipment information database 1G and thereby specifies the personal computer 9 (report target) that is normally used by the employee 3. A message (location information) indicating that the employee 3 is in the room B is then transmitted to the personal computer 9 (step S17).

The personal computer 9 is provided with a function, by which, when such a message (location information) is received, the message is displayed on the display in the screen-locked state. The message indicating that the employee 3 "is entering the room B" (or a message, such as "Presently in the room B") can thus be made to be displayed automatically on the display of the personal computer 9 in the screen-locked state (step S18). Thus when a telephone call for the employee 3 is made to a telephone in the room A, a colleague of the employee 3 in the room A can confirm that the employee 3 is presently in the room B by viewing the message displayed on the display of the personal computer 9 and can thus accommodate the telephone call appropriately. For example, if the employee 3 needs to be contacted urgently, a telephone call is made to the room B.

A case, where the employee 3, for whom the meeting in the room B has ended, goes out for lunch, shall now be considered. In this case, the employee 3 brings the contactless IC card 4 close to the IC card reader 6B at the exit side of the room B and makes the employee ID stored in the contactless IC card 4 be read (step S19). The employee ID read by the IC card reader 6B is transmitted to the information processing device 1 (step S20). The information processing device 1 performs an authentication process, based on the information registered in the employee information database 1F, on the received employee ID (step S21). If correct authentication is performed in this authentication process, an instruction signal for unlocking the lock of the door is transmitted from the information processing device 1 to the door locking/unlocking device 8B (step S22). Upon receiving this instruction signal, the door locking/unlocking device 8B unlocks the lock of the door 7B (step S23). The employee 3 is thereby enabled to open the door 7B and exit the room B. On the other hand, if the authentication process fails in step S21, the process ends without the instruction signal for unlocking the lock of the door 7B being transmitted from the information processing device 1 to the door locking/unlocking device 8B.

If the authentication process in step S21 succeeds, the information processing device 1 can obtain the information that "the employee 3 has exited the room B." A process of notifying this exit information to the personal computer 9 of the employee 3 is thus performed. That is, the information processing device 1, on the basis of the employee ID received from the IC card reader 6B, recognizes the personal computer management number that is registered in association with the employee ID in the equipment information database 1G and thereby specifies the personal computer 9 (report target) that is normally used by the employee 3. A message indicating that the employee 3 is out of the room B is then transmitted to the personal computer 9 (step S24).

The personal computer 9 that receives such a message can automatically display a message indicating that the employee 3 "is exiting from the room B" (or a message, such as "Has exited the room B") on the display (step S25). A colleague in the room A can thus recognize that the employee 3 has already left the room B.

When the employee 3 thereafter enters another, unillustrated room C, a message, such as "Entered the room C," is displayed, and when the employee 3 exits the room C, a message, such as "Exited the room C," is displayed. Obviously, if all of the history of messages received in the past are made to be displayed on the display of the personal computer 9, the activity history of the employee 3 can be shown in order in the manner of: "Entered the room B"/"Exited the room B"/"Entered the room C"/"Exited the room C." Also, by providing the information processing device 1 with a function that enables recognition of the present time, the information processing device 1 can be made to transmit a message that includes the time of entry or exit to enable a message to be displayed along with the time on the display of the personal computer 9 as in "Entered the room B at 10:32."

Because the location of the employee 3 is thus displayed successively on the display even when the personal computer 9 is in the screen-locked state, a colleague in room A can recognize the location of the employee 3. Although in the above description, only process operations concerning a single employee 3 was described, by employing the system for all employees performing work on personal computers, the location information of employees who have become absent can be displayed on the displays of the employees' personal computers and contact information, etc., can be made known to other employees.

Also, although in the description above, the employee ID is recorded in the contactless IC card 4 as identification information for specifying the employee 3, the identification information recorded in the contactless IC card does not necessarily have to be information that specifies an employee (that is, a user of a personal computer) and may be information that specifies a personal computer itself For example, by recording a personal computer management number or IP address, etc., which specifies the personal computer 9 of the employee 3, as the identification information in the contactless IC card 4, the information processing device 1 can directly recognize that the personal computer (report target) that is to be the transmission destination of location information is the personal computer 9. Also, the personal computer 9 itself does not need to be installed in a room, with which exit and entry are managed.

Thus with the screen lock absence display system described here, because even when a user of a personal computer leaves his/her desk, information on his/her location is displayed on the screen-locked personal computer, he/she can be contacted even when a need to contact him/her urgently arises. Also, because an entry reading device, which reads the identification information recorded in an information recording medium when entry into a room is performed, and an exit reading device, which reads the identification information recorded in an information recording medium when exit from a room is performed, are provided separately, and the information processing device 1 can transmit location information indicating entry into a room when an entry reading device reads identification information and transmit location information indicating exit from a room when an exit reading device reads identification information, whether a person has entered or has exited a specific room is made to be displayed on a display of a personal computer. Furthermore, because this screen lock absence display system uses contactless IC cards and IC card readers, even when employee ID cards or other personal identification cards are being used already, the system can be used in combination with a system for such cards.

Lastly, an extremely practical measure concerning the above-described screen lock absence display system shall be described. With the above-described example, it was described that when an operation input is not performed on the personal computer 9 for a preset time, the screen lock starts up and a state, in which use by a third party is disabled, is entered automatically. However, for practical use, it is preferable to arrange specifications such that the screen lock is started up automatically without waiting for the elapse of time at the point in time at which the employee 3 interrupts work on the personal computer 9 and leaves the room A. With such specifications, in a case where the employee 3 exits from the room A, in which the personal computer 9 is installed, the screen lock of the personal computer 9 is started up automatically at the point in time at which this exit is detected. Such specifications can be realized by using the IC card reader 6A disposed near the exit of the room A in which the personal computer 9 is installed (the exit reading device that reads the identification information from the information recording medium 4 in the process of exit from the room A).

That is, the employee 3, in exiting from the room A, brings the contactless IC card 4 close to the IC card reader 6A at the exit side of the room A and makes the employee ID, stored in the contactless IC card 4, be read. The employee ID read by the IC card reader 6A is transmitted to the information processing device 1. Here, the information processing device 1 performs the authentication process, based on the information registered in the employee information database 1F, on the received employee ID, and if the authentication succeeds, transmits the unlocking signal to the door locking/unlocking device 8A. In this process, the information processing device 1 can recognize, based on the identification information read from the contactless IC card 4, that is, the employee ID of the employee 3, that the personal computer 9 is the personal computer of the employee 3.

When it has thus become clear, when a specific employee exits from a specific room, that the specific employee's own personal computer is installed in the specific room, a process, by which the screen lock of the personal computer is started up by the information processing device 1, is performed. Specifically, the information processing device 1 is made to transmit an instruction signal, instructing the startup of the screen lock, to the personal computer 9. By preparing an arrangement at the personal computer 9 by which the screen lock is started up automatically when such an instruction signal is provided, the personal computer 9 is automatically put in the screen-locked state by the instruction signal from the information processing device 1. By employing such an arrangement, when a person leaves a room, in which a personal computer used by himself/herself is installed, the screen lock of the personal computer is started up automatically and thus an additional effect of preventing unauthorized use by a third party is provided. In this case, at the point in time at which a person leaves the room A and the screen lock on the personal computer 9 starts up, an absence message, such as "XXX is presently not in the room A," is made to be displayed on the screen of the personal computer 9, and a destination display, such as "XXX is presently in the room B," is made at the point in time at which the location of the person is detected.

What is claimed is:

1. A system using electronic devices connected to a network, the system comprising:
   a plurality of electronic devices mutually connected by the network and respectively installed at mutually different locations; and
   a portable information recording medium, having a function, by which, when using an electronic device among at least a portion of the electronic devices, said electronic device is communicated with and made to perform authentication;
   information indicating a specific electronic device that is to be a report target being recorded in the information recording medium; and
   at least one of the electronic devices having a function, by which, when in communication with the information recording medium, location information, indicating a location of said at least one electronic device, is transmitted via the network to the specific electronic device to be the report target that is recorded in the information recording medium.

2. The system using electronic devices connected to a network according to claim 1, wherein
   a plurality of information recording media, in each of which a predetermined medium identification code is recorded, are prepared, and at least one of the electronic devices has a function, by which, when in communication with a specific information recording medium, a medium identification code recorded in the specific information recording medium, is transmitted along with the location information, via the network to the specific electronic device to be the report target that is recorded in the specific information recording medium.

3. A system using electronic devices connected to a network, the system comprising:
   a plurality of electronic devices mutually connected by the network and respectively installed at mutually different locations; and
   a portable information recording medium, having a function, by which, when using an electronic device among at least a portion of the electronic devices, said electronic device is communicated with and made to perform authentication;
   said information recording medium comprising:
      a communicating unit for communicating with each of the electronic devices;
      an authentication information storage unit, storing authentication information necessary for making at least a portion of the electronic devices perform correct authentication; and
      a report target device registration unit, storing information indicating a report target device;
   at least one of the electronic devices comprising:
      a communicating unit for communicating with the information recording medium;
      an authentication unit, using authentication information stored in the information recording medium when in communication therewith, to authenticate the information recording medium and permitting use of said at least one electronic device when a correct authentication result is obtained;
      a device identification code storage unit, storing a device identification code provided to said at least one electronic device to enable the respective electronic devices to identify each other on the network;
      a location information storage unit, storing location information indicating a location of installation of said at least one electronic device; and
      a location information transmitting unit, reading out a device identification code from the report target device registration unit of the information recording medium in communication therewith, and transmitting, via the network, the location information stored in the location information storage unit, to another electronic device specified by the read-out device identification code; and
   the electronic devices including a designatable electronic device which can be designated as a report target, said designatable electronic device comprising:
      a device identification code storage unit, storing a device identification code provided to said designatable electronic device to enable the respective electronic devices to identify each other on the network; and
      a location information presenting unit, storing location information transmitted via the network to said designatable electronic device and presenting the location information by a predetermined method.

4. The system using electronic devices connected to a network according to claim 3, wherein
   at least one of the electronic devices comprises:
   a report target writing unit, performing a process of writing a device identification code concerning a specific electronic device into the report target device registration unit in the information recording medium in communication therewith.

5. The system using electronic devices connected to a network according to claim 3, wherein
   the designatable electronic device comprises:
   a report target writing unit, having a function of writing a device identification code of said designatable electronic device stored in the device identification code storage unit, into the report target device registration unit in the information recording medium in communication therewith.

6. The system using electronic devices connected to a network according to claim 5, wherein
   the designatable electronic device has a function to input a user request, and
   when said request is that said designatable electronic device itself be designated as a report target device, the report target writing unit executes a process of writing a device identification code of said designatable electronic device into the report target device registration unit in the information recording medium in communication therewith, and when said request is that another designatable electronic device besides said designatable electronic device be designated as a report target device, the report target writing unit executes a process of writing a device identification code of said another designated electronic device into the report target device registration unit in the information recording medium in communication therewith.

7. The system using electronic devices connected to a network according to claim 3, wherein
   a plurality of information recording media, having mutually different predetermined medium identification codes recorded therein, are prepared,
   the location information transmitting unit reads out a medium identification code along with a device identification code from an information recording medium in communication and transmits, via the network, location information stored in the location information storage unit, and the read-out medium identification code to another electronic device specified by the read-out device identification code, and
   the location information presenting unit, upon transmission of location information and a medium identification code via the network, presents the location information and the medium identification code or a user name associated with the medium identification code.

8. The system using electronic devices connected to a network according to claim 7, wherein
   the authentication information, stored in the authentication information storage unit, or a portion of the authentication information is used as the medium identification code.

9. The system using electronic devices connected to a network according to claim 3, wherein
   a plurality of designatable electronic devices are prepared,
   the report target device registration unit in the information recording medium is arranged to enable writing of device identification codes concerning a plurality of said designatable electronic devices, and
   the location information transmitting unit, in a case where a plurality of device identification codes are written in the report target device registration unit of the information recording medium in communication therewith, performs information transmission to each of the electronic devices respectively specified by the individual device identification codes.

10. The system using electronic devices connected to a network according to claim 3, wherein
the location information presenting unit presents only newest location information transmitted via the network, and presents, in a case where location information is transmitted along with a medium identification code, newest location information for the medium identification code.

11. The system using electronic devices connected to a network according to claim 3, wherein
the location information presenting unit presents a plurality of pieces of location information in a listed manner, transmitted via the network, in an order that is in accordance with a time sequence, and presents, in a case where location information is transmitted along with a medium identification code, in an order that is in accordance with a time sequence for the medium identification code.

12. The system using electronic devices connected to a network according to claim 3, wherein
only when a user provides an instruction for presenting location information to an electronic device that is designated as a report target, the location information presenting unit in the electronic device performs presentation of the location information on a display screen of the electronic device.

13. The system using electronic devices connected to a network according to claim 3, wherein
when an electronic device that is designated as a report target enters a rest mode, the location information presenting unit in the electronic device automatically performs presentation of the location information on a display screen of the electronic device.

14. The system using electronic devices connected to a network according to claim 3, wherein the location information presenting unit has a function of presenting the location information by audio.

15. The system using electronic devices connected to a network according to claim 3, wherein
an electronic bulletin board, provided with a predetermined device identification code and enabled to receive location information transmitted to itself via the network and present the location information, is provided as a designatable electronic device.

16. The system using electronic devices connected to a network according to claim 3, wherein
a telephone, provided with a predetermined device identification code and having a function of receiving location information transmitted to itself via the network and transferring a call made to itself to another telephone installed at a location specified by the location information, is provided as a designatable electronic device.

17. The system using electronic devices connected to a network according to claim 3, wherein
the designatable electronic device deletes, on the basis of a user instruction or establishment of a predetermined condition, location information received in the past and prevents subsequent presentation concerning the location information.

18. The system using electronic devices connected to a network according to claim 3, wherein
at least any one or plurality of the electronic devices is or are provided with a function of deleting, on the basis of a user instruction or establishment of a predetermined condition, predetermined device identification codes recorded in the report target device registration unit in the information recording medium.

19. The system using electronic devices connected to a network according to claim 3, wherein
a network using an IP protocol is used as the network and IP addresses are used as the device identification codes.

20. The system using electronic devices connected to a network according to claim 3, wherein
the location information transmitting unit performs information transmission by means of e-mail.

21. The system using electronic devices connected to a network according to claim 1, wherein
computers, printers, copiers, or other office furniture or equipment, electronic locks, or electronic bulletin boards are used as a portion of the electronic devices.

22. A program in a computer for making the computer function as an electronic device in a system according claim 1.

23. A method of presenting a location of a user using a system including:
a plurality of electronic devices mutually connected by a network and respectively installed at mutually different locations; and
a portable information recording medium, having a function, by which, when using an electronic device among at least a portion of the electronic devices, said electronic device is communicated with and made to perform authentication;
the method comprising:
recording, by the information recording medium, information indicating a specific electronic device on which a presentation of location is to be performed;
transmitting, by an electronic device, when the electronic device communicates with the information recording medium, via the network, location information, indicating its own location, to the specific electronic device on which the presentation of location is to be performed, recorded inside the information recording medium; and
presenting, by the specific electronic device, the location information, upon receiving the location information.

24. A location notification system comprising: a plurality of fixed devices, installed at mutually different locations; and a portable mobile device, having a function of communicating with any of the fixed devices by being brought within a communicable area of a fixed device; and wherein
the mobile device has recorded therein information indicating a specific fixed device, and
each of the fixed devices has a function, by which, when in communication with the mobile device, a location information, indicating a location of the fixed device itself, is transmitted to the specific fixed device recorded in the mobile device.

25. A screen lock absence display system, displaying, on a screen-locked personal computer, location information of a user of the personal computer, the screen lock absence display system comprising:
a personal computer, having a function of performing a screen lock of not accepting an operation input for a primary process until a lock release process is performed by a user and a function of displaying location information, received from the exterior, on a display in a screen-locked state;
a portable information recording medium, having recorded therein identification information that specifies the personal computer or the user thereof;

reading devices, being installed near each of one or more exits and entrances of a plurality of rooms and reading the identification information recorded in the information recording medium when entry into or exit from any of the rooms is performed;

a door locking/unlocking device that, based on identification information read by a reading device of a specific room, controls a lock state of a door of the specific room; and an information processing device that, based on the identification information read by a reading device of a specific room, specifies the personal computer and transmits room information, indicating the specific room, as the location information to the personal computer.

26. The screen lock absence display system according to claim 25, comprising:

an entry reading device, reading the identification information recorded in the information recording medium when entry into each room is performed, and an exit reading device, reading the identification information recorded in the information recording medium when exit from each room is performed, and wherein the information processing device transmits location information, indicating entry into a room, when the entry reading device has read the identification information and transmits location information, indicating exit from a room, when the exit reading device has read the identification information.

27. The screen lock absence display system according to claim 25, wherein the information processing device is provided with:

an employee information database, indicating door unlocking authorities associated with identification information;

an authentication means, using the employee information database to authenticate, based on identification information read by a reading device of a specific room, the door unlocking authority for the specific room; and an unlocking signal transmitting means, transmitting an unlocking signal to the door locking/unlocking device of the specific room when a correct authentication result is obtained by the authentication means; and the door locking/unlocking device performs unlocking upon receiving the unlocking signal.

28. The screen lock absence display system according to claim 25, wherein identification information specifying the user of the personal computer is recorded in the portable information recording medium, an equipment information database, associating the identification information with the personal computer, is prepared in the information processing device, and the information processing device uses the equipment information database to specify the personal computer to be a transmission destination of the location information.

29. The screen lock absence display system according to claim 25, wherein near an exit of a room in which the predetermined personal computer is installed, an exit reading device, which reads the identification information from the information recording medium when exit from the room occurs, is provided, and when a personal computer specified based on the identification information read by the exit reading device is the predetermined personal computer, the information processing device performs a process of making a screen lock of the predetermined personal computer be started up.

30. The screen lock absence display system according to claim 25, wherein the portable information recording medium is a contactless IC card and the reading devices are IC card readers.

* * * * *